US012811861B2

(12) United States Patent
Oliveira et al.
(10) Patent No.: US 12,811,861 B2
(45) Date of Patent: *Nov. 24, 2026

(54) MULTI-SERVICE VIEWS FOR NETWORK MONITORING VISUALIZATION

(71) Applicant: Cisco Technology, Inc., San Jose, CA (US)

(72) Inventors: Ricardo V. Oliveira, San Francisco, CA (US); Nelson Jorge Silva Rodrigues, Walnut Creek, CA (US); Prabhnit Singh, El Dorado Hills, CA (US); Victor Orlov, Waxhaw, NC (US); Florent Patrick Jean Garit, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 113 days.

This patent is subject to a terminal disclaimer.

(21) Appl. No.: 18/899,239

(22) Filed: Sep. 27, 2024

(65) Prior Publication Data

US 2025/0023797 A1 Jan. 16, 2025

Related U.S. Application Data

(63) Continuation of application No. 17/877,652, filed on Jul. 29, 2022, now Pat. No. 12,137,037.

(Continued)

(51) Int. Cl.

*G06F 15/173* (2006.01)
*H04L 41/0681* (2022.01)

(Continued)

(52) U.S. Cl.

CPC .......... *H04L 41/22* (2013.01); *H04L 41/0681* (2013.01); *H04L 43/045* (2013.01); *H04L 43/16* (2013.01)

(58) Field of Classification Search

CPC ... H04L 41/22; H04L 41/0681; H04L 43/045; H04L 43/16

See application file for complete search history.

(56) References Cited

U.S. PATENT DOCUMENTS 10,284,444 B2 5/2019 Akens et al.
10,382,297 B2 8/2019 Ganesh (Continued)

*Primary Examiner* — Padma Mundur

(74) *Attorney, Agent, or Firm* — Lee & Hayes, P.C.

(57) ABSTRACT

In one embodiment, a method comprises: obtaining a plurality of results for a corresponding plurality of independent tests performed on a corresponding plurality of services in a computer network, the plurality of results comprising one or more determined pathways through the computer network; determining a specified subset selection regarding the plurality of results, the specified subset selection corresponding to at least two independent service-related tests; combining a portion of the plurality of results into an aggregated results subset according to the specified subset selection; generating a graphical representation visualization of the aggregated results subset, the graphical representation visualization illustrating a plurality of specific pathways through the computer network corresponding to the aggregated results subset; and providing, to a graphical user interface, the graphical representation visualization of the aggregated results subset, the graphical user interface providing for further specification of the specified subset selection regarding the plurality of results.

20 Claims, 22 Drawing Sheets

Related U.S. Application Data

(60) Provisional application No. 63/227,954, filed on Jul. 30, 2021.

(51) Int. Cl.

| | |
|---|---|
| ***H04L 41/22*** | (2022.01) |
| ***H04L 43/045*** | (2022.01) |
| ***H04L 43/16*** | (2022.01) |

(56) References Cited

U.S. PATENT DOCUMENTS

| | | | | |
|---|---|---|---|---|
| 10,567,249 | B1 * | 2/2020 | Bauan | H04L 41/22 |
| 10,659,325 | B2 | 5/2020 | Dam et al. | |
| 10,841,187 | B2 | 11/2020 | Dam et al. | |
| 10,848,402 | B1 | 11/2020 | Haddow et al. | |
| 10,924,366 | B2 | 2/2021 | Rizzi et al. | |
| 2019/0109757 | A1 | 4/2019 | Oliveira et al. | |
| 2019/0230015 | A1 * | 7/2019 | Lad | H04L 43/0852 |
| 2019/0372829 | A1 * | 12/2019 | Green | H04L 41/064 |
| 2021/0126844 | A1 | 4/2021 | Haddow et al. | |
| 2021/0243099 | A1 | 8/2021 | Lad et al. | |

* cited by examiner

600

MULTI-SERVICE VIEWS FOR NETWORK MONITORING VISUALIZATION

RELATED APPLICATION

This application is a continuation of U.S. patent application Ser. No. 17/877,652, filed on Jul. 29, 2022, which claims priority to U.S. Provisional Appl. Ser. No. 63/227,954, filed Jul. 30, 2021, all entitled MULTI-SERVICE VIEWS FOR NETWORK MONITORING VISUALIZATION, by Oliveira, et al., the contents of which are incorporated herein by reference in its entirety.

TECHNICAL FIELD

The present disclosure relates generally to computer systems, and, more particularly, to multi-service views for network monitoring visualization.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

In particular, network monitoring solutions are currently available that allow customers to monitor resources that impact performance of the customers' applications, services, etc. Visibility into such resources may be based on a suite of "agents" or pieces of software that are installed in different locations and devices in different computer and/or communications networks (e.g. around the world). Generally, however, the amount of data collected across the many layers of the network presents an issue for visualization. This is especially the case where the set of internal and external dependencies between any network element is particularly complex.

BRIEF DESCRIPTION OF THE DRA WINGS

The embodiments herein may be better understood by referring to the following description in conjunction with the accompanying drawings in which like reference numerals indicate identically or functionally similar elements, of which:

DESCRIPTION OF EXAMPLE EMBODIMENTS

Overview

Figure 1:
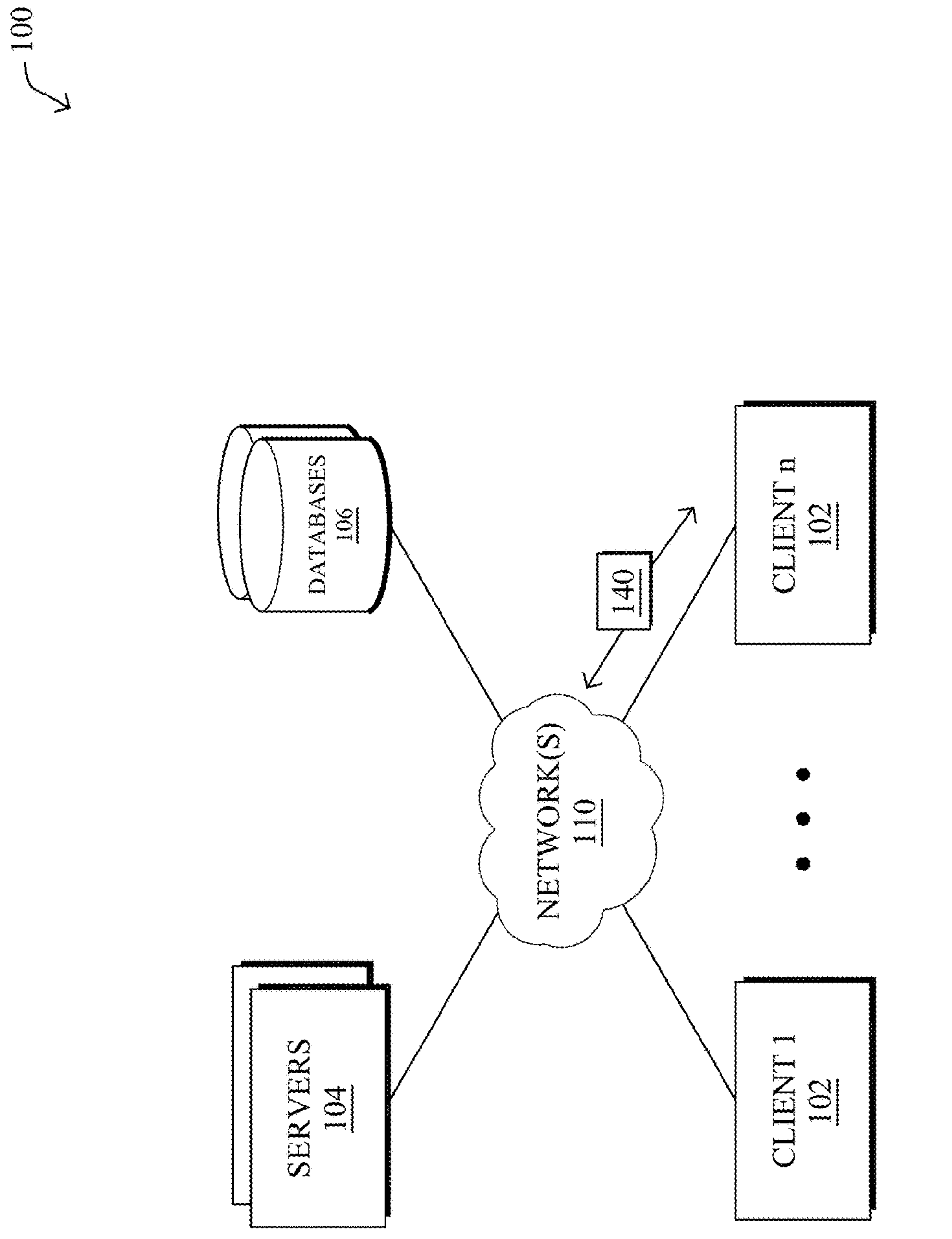
FIG. 1 illustrates an example computer network.

According to one or more embodiments of the disclosure, the techniques herein are directed toward multi-service views for network monitoring visualization.

Multi-service views enhances the correlation of service dependencies for faster insight and problem isolation for today's operations teams. That is, the techniques herein provide for multi-service views (or multi-test views) for network monitoring visualization, which builds on a multi-layered approach, by enabling multiple services—whether digital journey dependencies, multiple user groups, or different application tiers and modules—to be aggregated into a single visualization. This cross-service view delivers immediate insights for teams responsible for ensuring a good digital experience across a complex set of internal and external dependencies.

Specifically, according to one or more embodiments of the disclosure, an example method herein comprises: obtaining, by a process, a plurality of results for a corresponding plurality of independent tests performed on a corresponding plurality of services in a computer network, the plurality of results comprising one or more determined pathways through the computer network; determining, by the process, a specified subset selection regarding the plurality of results, the specified subset selection corresponding to at least two independent service-related tests; combining, by the process, a portion of the plurality of results into an aggregated results subset according to the specified subset selection; generating, by the process, a graphical representation visualization of the aggregated results subset, the graphical representation visualization illustrating a plurality of specific pathways through the computer network corresponding to the aggregated results subset; and providing, from the process to a graphical user interface, the graphical representation visualization of the aggregated results subset, the graphical user interface providing for further specification of the specified subset selection regarding the plurality of results.

Other embodiments are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
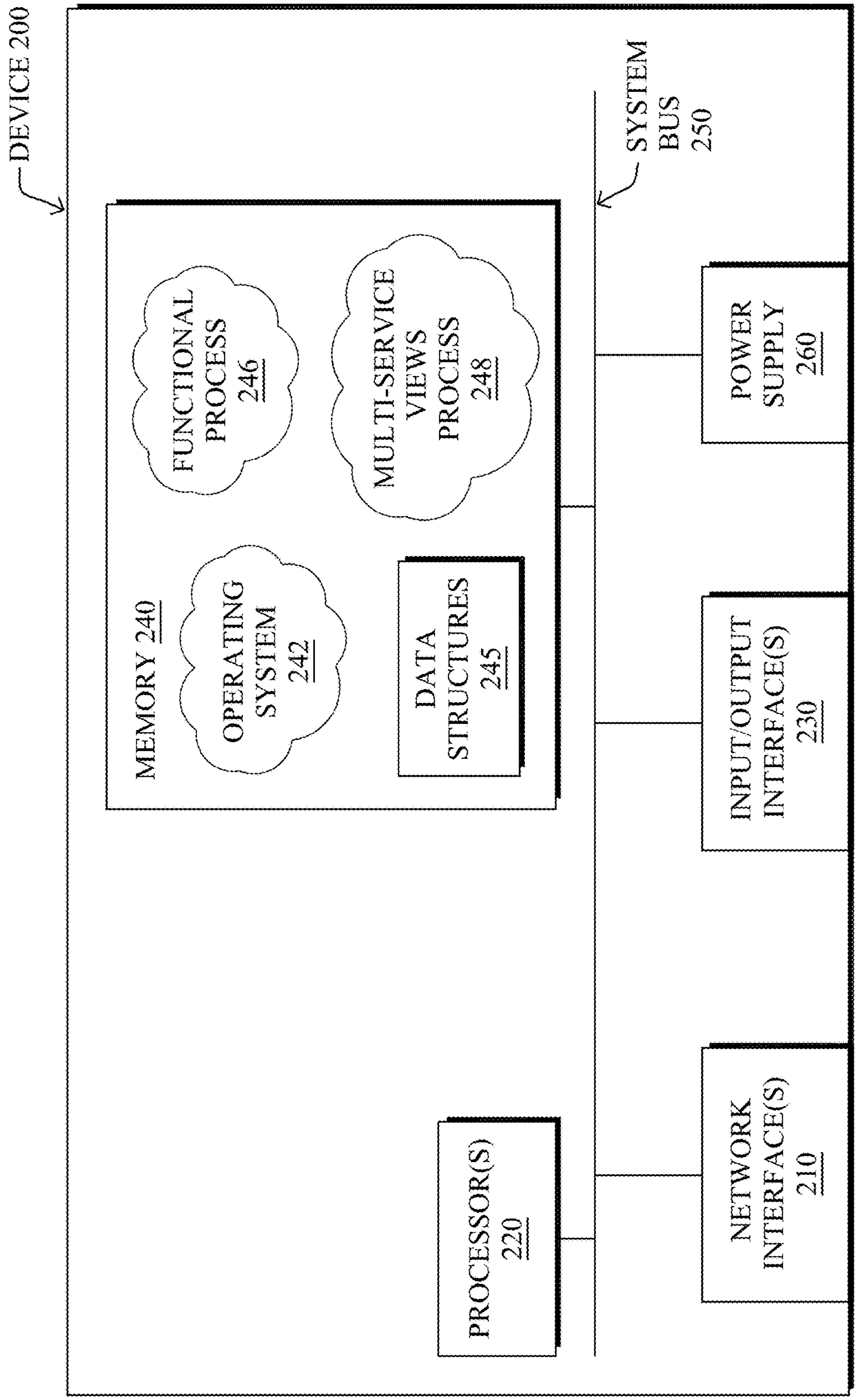
FIG. 2 illustrates an example computing device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, for example, wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative multi-service views process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Observability Intelligence Platform

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming, if not impossible (e.g., for a mere user of the SaaS service). For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more embodiments herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and end point agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable embodiment of categorical classification.

Figure 3:
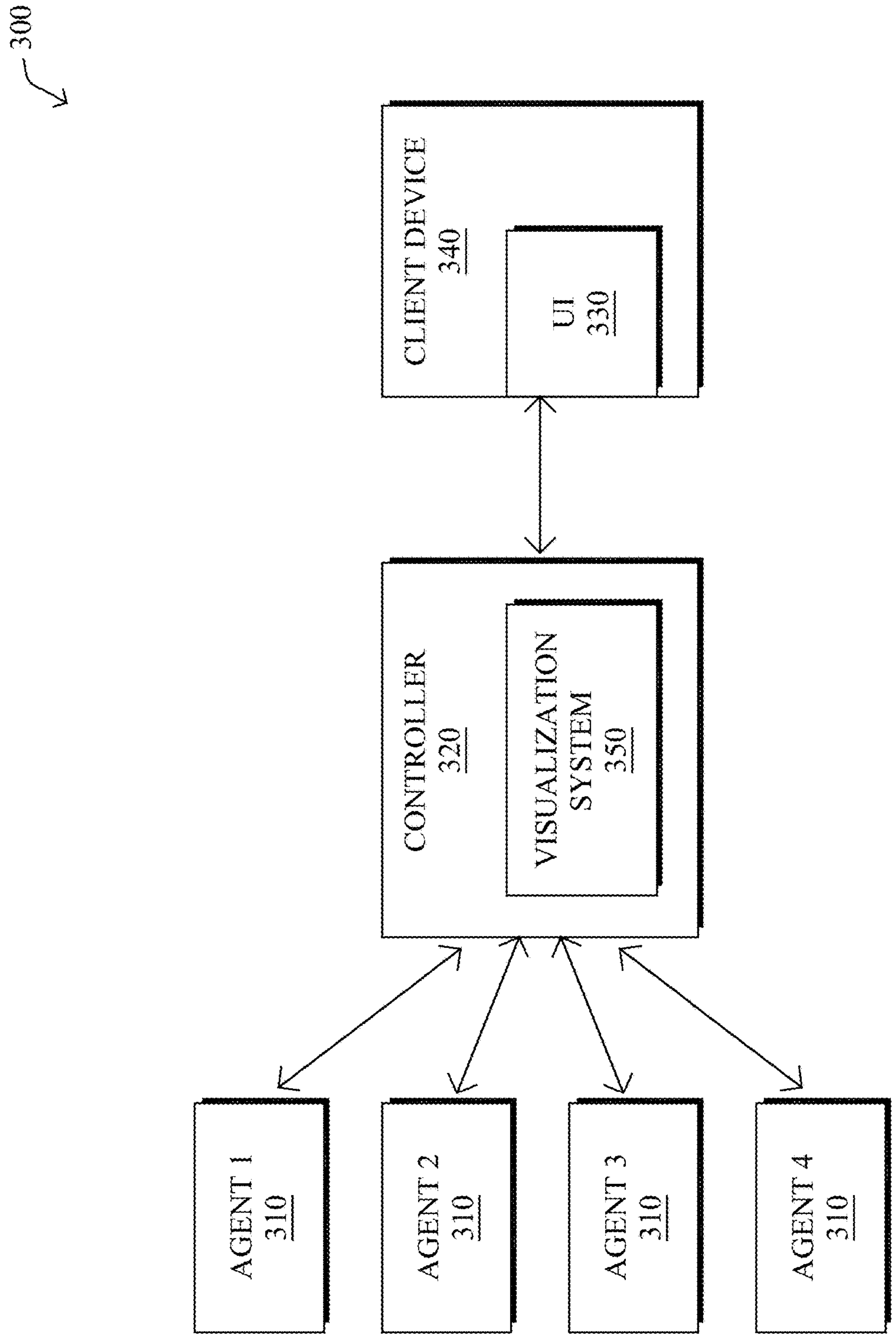
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents 310 and one or more servers/controller 320. Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller(s) 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page—e.g., load a shopping website, log in, search for an item, add it to the shopping cart, etc.).

The controller 320 is the central processing and administration server for the observability intelligence platform. The controller 320 may serve a browser-based user interface (UI) 330 that is the primary interface for monitoring, analyzing, and troubleshooting the monitored environment. Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, an instance of controller 320 may be hosted remotely by a provider of the observability intelligence platform 300. In an illustrative on-premises (On-Prem) implementation, an instance of controller 320 may be installed locally and self-administered.

The controller 320 receive data from different agents 310 (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, or a datacenter at the core of the edge of a network, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain embodiments, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain embodiments, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the extensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

Multi-Service Views for Network Monitoring Visualization

As noted above, network monitoring solutions are currently available that allow customers to monitor networks and applications that, while not necessarily under the control, management, operation, etc. of the customers, still impact performance of the customers' applications, services, etc. Visibility into such resources may be based on a suite of "agents" or pieces of software that are installed in different locations and devices in different computer and/or communications networks (e.g. around the world).

Examples of different agents, as described herein above, may comprise: a) cloud agents (e.g., deployed and maintained by the network monitoring solution provider), b) enterprise agents (e.g., installed and operated in a customer's network), and c) end point agents, which may be a different version of the previous agents that is installed on actual users' (e.g., employees') devices (e.g., on their web browsers or otherwise). Each of these agents may be configured to run tests from their respective devices, where the tests allow a customer to customize from a suite of tests against different networks and applications or any resource that they are interested in having visibility into. For example, a given test may offer provide visibility into one or more resources of a particular end point (e.g., at a "layer" where the test is being performed). Alternatively, a test may provide visibility into what is in between the end point and another component, for example, how a device is specifically connected through a network to an end resource (e.g., full visibility at various and multiple layers). In operation, essentially, when a customer uses one or more agents to run tests, probe packets travel through the Internet, go through many different networks, measure/monitor a given metric, component, etc., and the network monitoring solution gathers all of that data (e.g., from returned packets, responses, and so on, or, particularly, a lack thereof).

The tests that a given agent performs may comprise HTTP tests (e.g., using curl to connect to a server and load the main document served at the target), Page Load tests (e.g., using a browser to load a full page, in other words, the main document along with all other components that are included in the page), or Transaction tests (e.g., like Page Load test but also performing multiple tasks/steps within given page like, load a shopping website, log in, search for an item, add it to the shopping cart, etc.).

Correlation of application experience with network delivery is one of the primary tasks for network monitoring platforms. The network has long been the de facto vector of blame when users experience slowness in accessing their business-critical applications. This issue becomes further acute as applications move to the cloud and what was once a self-managed, internal network with a small set of WAN providers is now a conglomerate of ISPs that eventually connect the user to the cloud. In this new world, IT and cloud operations teams have looked to network monitoring platforms to quickly understand the fault domain, whether it is the local network, Internet, cloud provider network, or the application service.

In general, by collecting data across multiple layers and visualizing where problems occur, network monitoring platforms enables operations teams to dramatically lower the mean time to detect problems, so they can quickly triage the issue or escalate to the appropriate internal or external team. In this sense, network monitoring platforms are a decision engine that allows different operations teams to quickly understand what action should be taken to resolve a user issue.

As noted above, however, the amount of data collected across the many layers of the network presents an issue for visualization. This is especially the case where the set of internal and external dependencies between any network element is particularly complex.

The techniques herein, therefore, provide for multi-service views (or multi-test views) for network monitoring visualization, which builds on a multi-layered approach, by enabling multiple services—whether digital journey dependencies, multiple user groups, or different application tiers and modules—to be aggregated into a single visualization. This cross-service view delivers immediate insights for teams responsible for ensuring a good digital experience across a complex set of internal and external dependencies.

As an example, multi service views provide the foundation to visually combine any set of services that are essential in completing the user experience picture. The below use cases, however, are common scenarios that present significant challenges to most enterprises:

- Showing Service Dependencies: To see SaaS or bespoke application dependencies to help measure overall application experience. To combine deep DNS visibility with Web based application experience.
- Decomposing Overlay Networks: To provide a single view for overlay and underlay networks to understand how they impact access to SWGs or SD-WAN fabrics.
- Network Path Correlation: To take the path visualization further by visualizing and correlating network paths across a cluster of services for faster troubleshooting.

Increasing SaaS and bespoke-application dependencies, in particular, are a first challenge. As enterprises increase their reliance on SaaS, external APIs and other services to support employees and customers, it has become increasingly important to understand and measure this across every critical piece of their digital supply chain. Even SaaS applications, which are typically experienced as monolithic by their users, often involve many interactions between and across edge dependencies, application tiers, and backend APIs.

As an example, a login experience of a user accessing a suite of applications (e.g., Office 365) via its authentication service, Azure AD. In order for any user to successfully login into an Office 365 application, for instance, the inventory of service dependencies in a typical “authentication waterfall” are as follows:

- Successfully resolving login.microsoftonline.com using the local DNS resolver and/or upstream DNS nameservers depending on caching
- Redirecting to www.office.com
- Redirecting to login.microsoftonline.com to initiate the validation and authentication process, which involves interacting with backend data stores.
- Loading objects from Edgecast CDN and another part of Microsoft’s network that serves login.live.com As can be seen, with one website URL, a user may actually be going to any number of different domains (e.g., four above) and are actually going to different networks across the Internet. That is, each of the respective services may depend upon independent networks that must be available for the login.microsoftonline.com login page to be served to users. Each of these separate workflows reveals an aspect of the overall journey users must complete in order for the login page to be loaded. When something goes wrong, knowing where in the user journey (and at what layer, e.g., app or network) is crucial to successfully identifying and resolving availability and performance issues. In still other scenarios, the user could be directed to even further locations, which can expand the complexity quickly, causing difficulty in measuring user performance and decomposing that into a viewable result.

Multi-service views herein, therefore, provide an aggregation of this data set, where test performed on applications, for example, expose dependencies throughout the Internet (e.g., that a testing customer does not own and is otherwise unaware of the dependency), showcasing potential problems in a more holistic way.

Figure 4A:
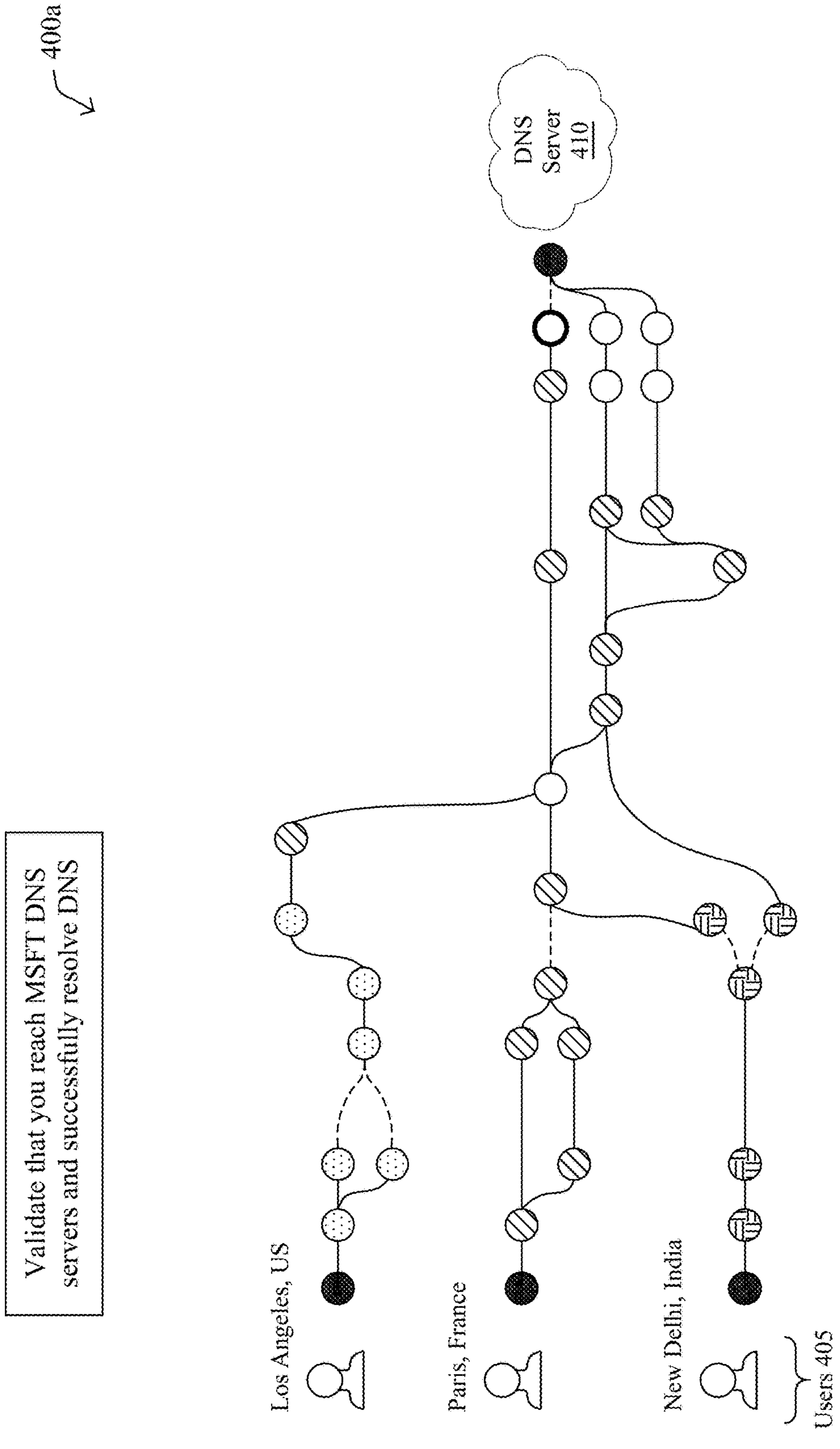
FIGS. 4A-4D illustrate an example of creating multi-service views in accordance with one or more embodiments described herein.
Figure 4B:
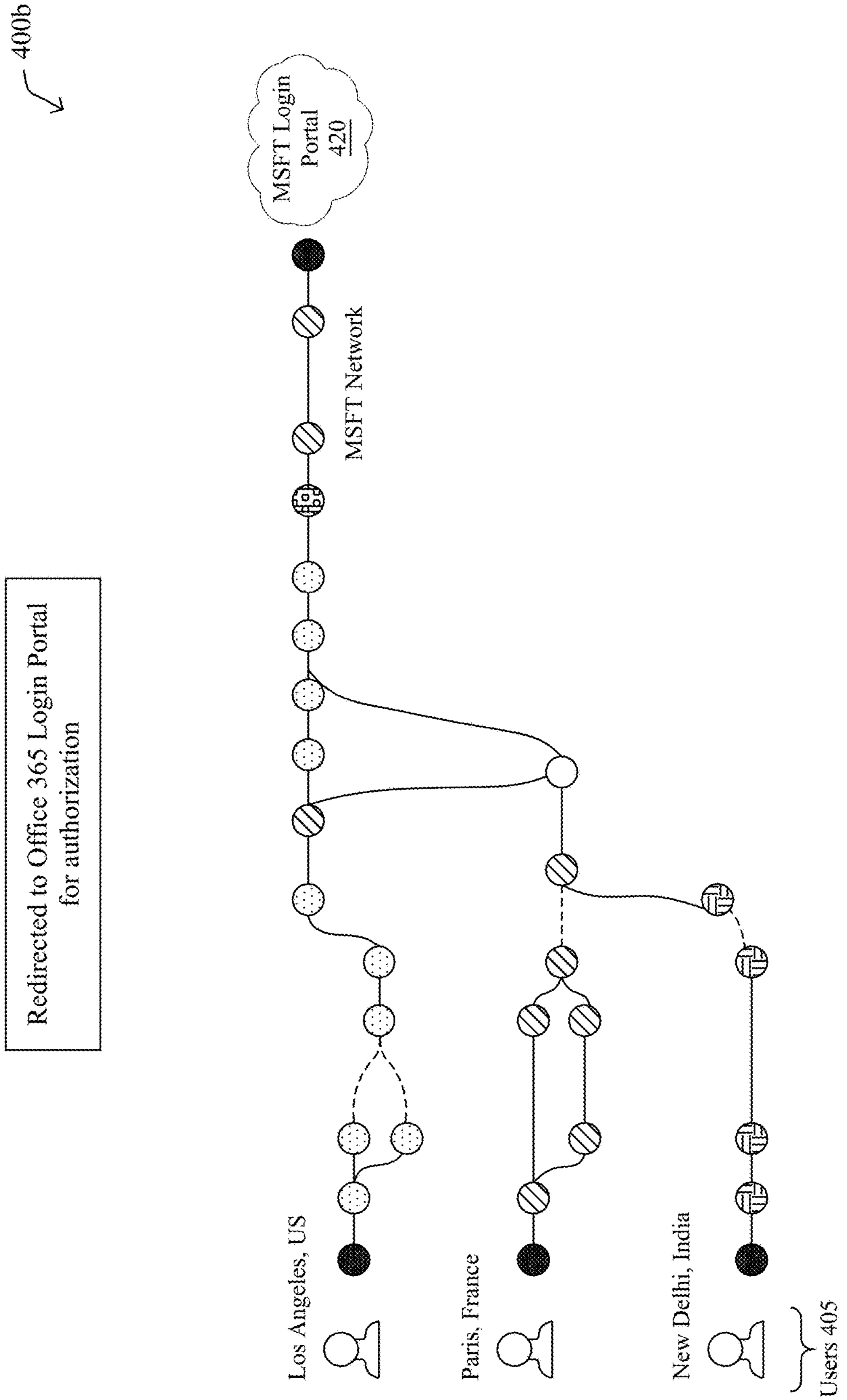
Figure 4C:
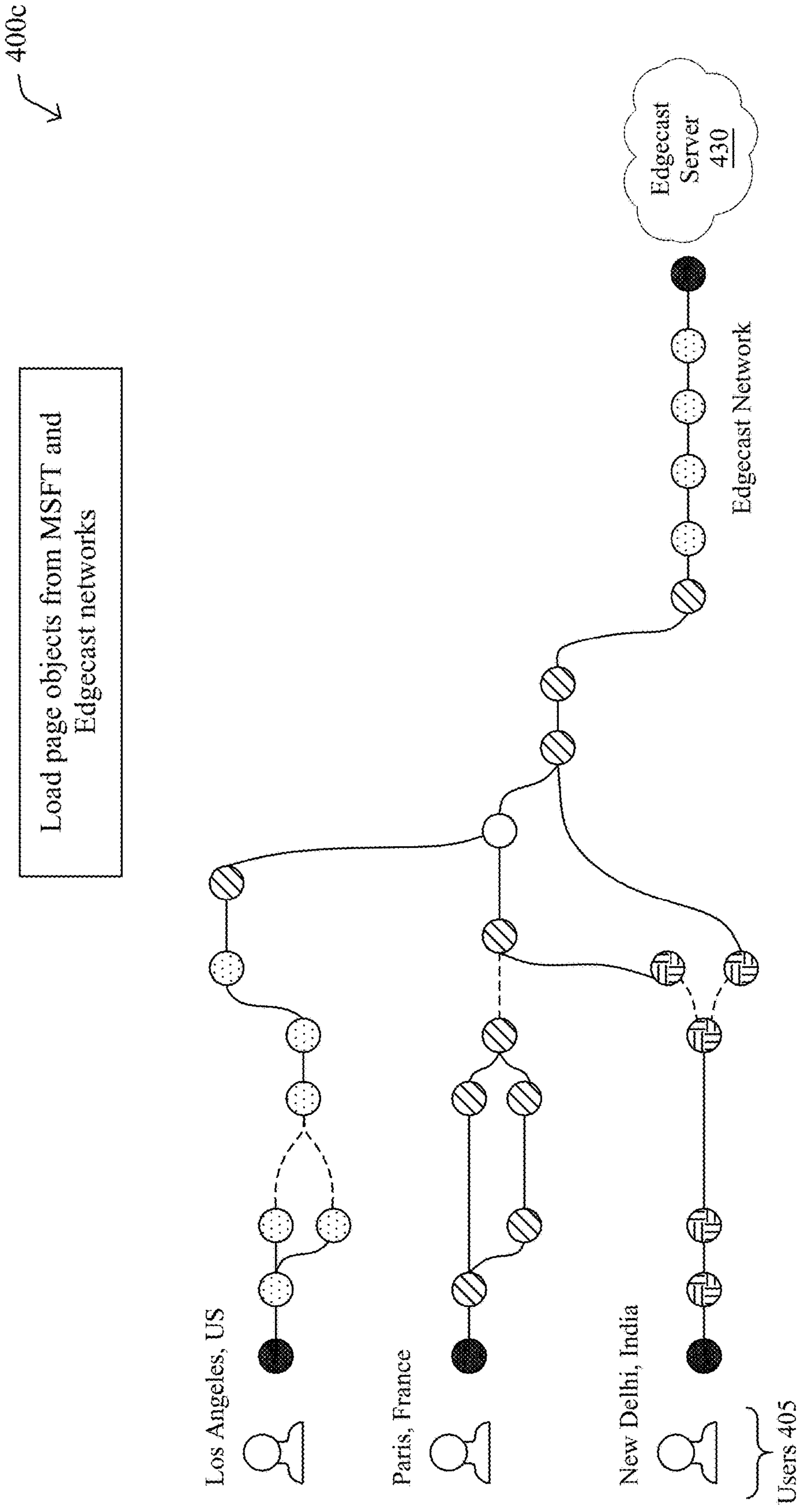
Figure 4D:
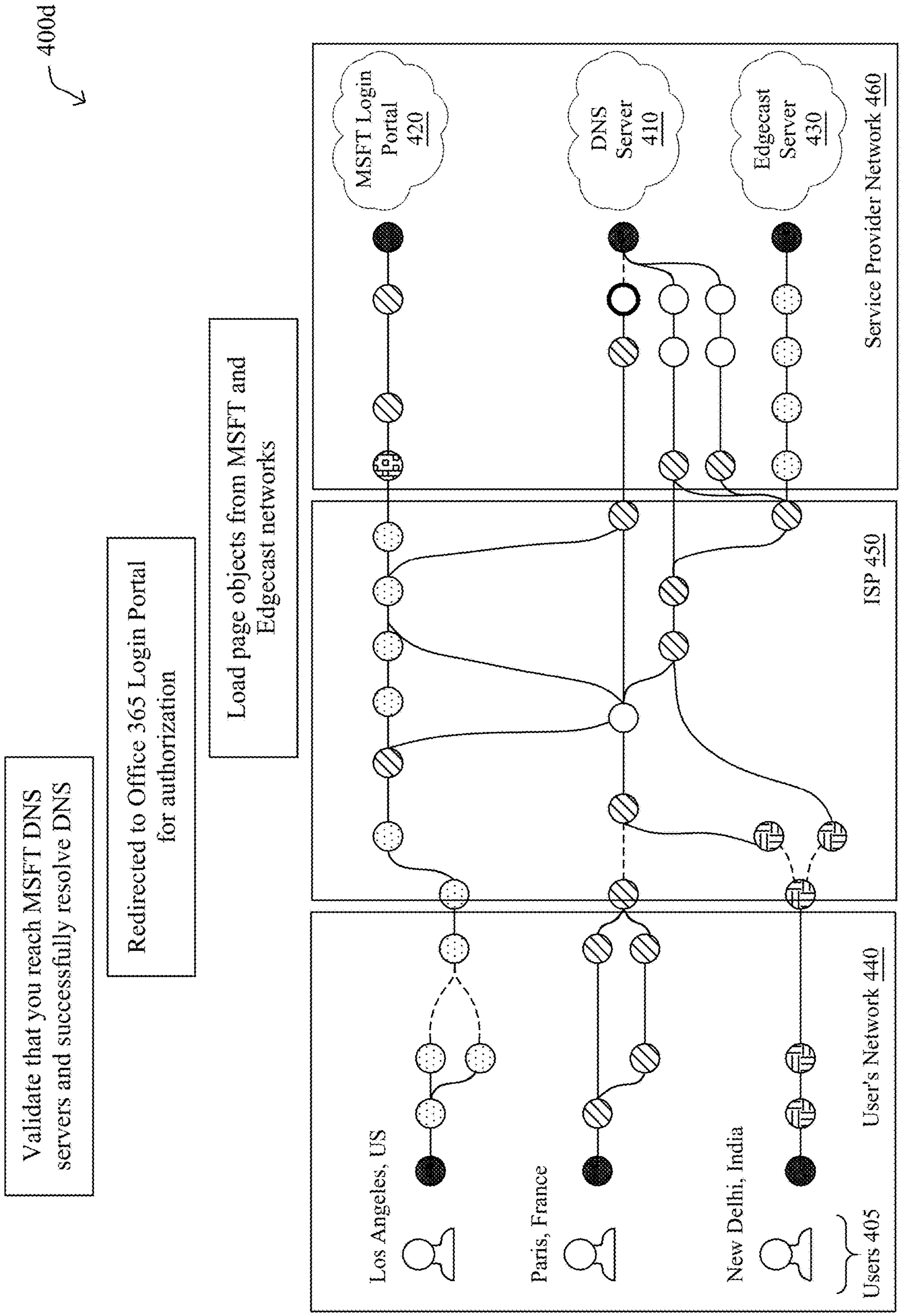

As an example, assume a set of users coming from Los Angeles, Paris, and New Delhi, each trying to log in to the example Office 365. The diagrams 400*a-c* (e.g., path traces) of FIGS. 4A-4C illustrate a series of independent views of a typical login process. FIG. 4D, on the other hand, illustrates a diagram 400*d* that is the holistic multi-service view provided by the techniques herein.

For instance, with reference to diagram 400*a* of FIG. 4A, first the team of users 405 would go to the Microsoft (MSFT) login portal to begin resolving the DNS via a DNS server 410 (through individual path traces that eventually converge on the server). Then, as shown in diagram 400*b* of FIG. 4B, the users 405 would be redirected to a login portal 420 for authorization. Finally, with reference to diagram 400*c* of FIG. 4C, they would now go to the Edgecast networks (servers 425) to get certain objects (load page objects, for example).

Each view above (400*a-c*) shows a different network topology for each individual service/operation, but according to the techniques herein, these views can be stitched together, such as the diagram 400*d* as shown in FIG. 4D.

Using the techniques herein, therefore, one can realize that there is a common set of nodes on the Internet for this process that are traversed (e.g., within user’s networks 440, ISPs 450, and service provider network 460), where if each service was examined individually, would not be readily apparent. Said differently, the simultaneous visibility across multiple services is where multi-service views herein can drive even faster outcomes. Multi-service views leverage the data collected across individual tests to build a single service view for users to understand how each dependency affects overall application experience.

Another example of a common scenario that presents significant challenges to most enterprises is the deconstruction (or decomposition) of overlay networks. Network overlays, in particular, have dramatically increased as enterprises have adopted software-defined WAN (SD-WAN) and cloud-based security services, and have had to scale VPN capacity to support secure access for a remote workforce. While overlay provisioning, policies, and performance are important, so too is the underlying network transport, which is increasingly Internet-based. Multi-service views herein deconstruct network connectivity into its constituent overlay and underlay parts, visualizing the end-to-end overlay tunnel endpoints, as well as every Layer 3 hop across the underlay.

The rise of cloud-based applications has led to a wider adoption of software-defined WAN solutions that allow customers to more efficiently use their WAN resources per end-user application needs. Using application-aware policies that are centrally managed and pushed down to WAN routers, enterprises can dramatically increase operational agility and network resilience.

Figure 5A:
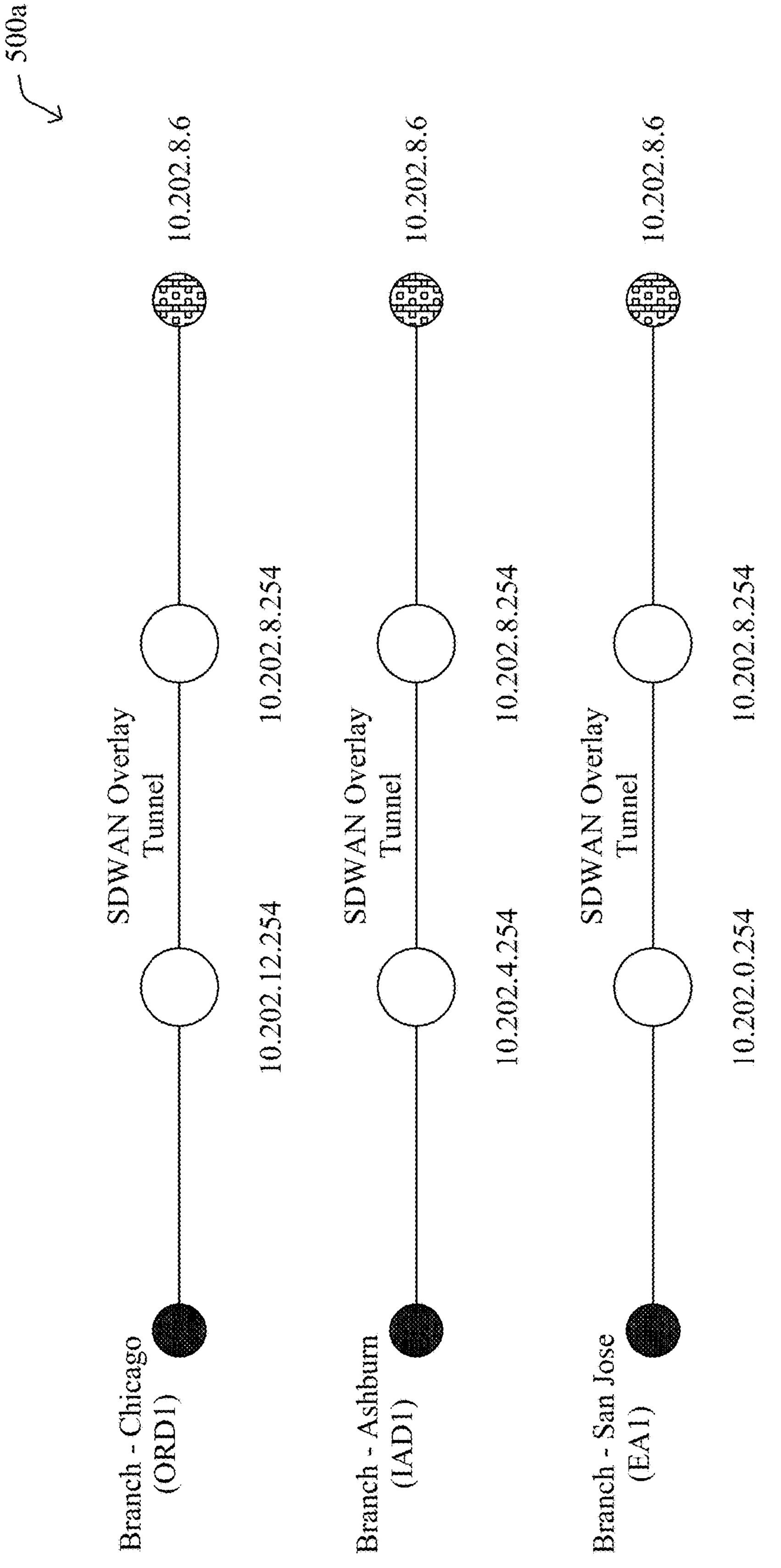
FIGS. 5A-5C illustrate another example of creating multi-service views in accordance with one or more embodiments described herein.
Figure 5B:
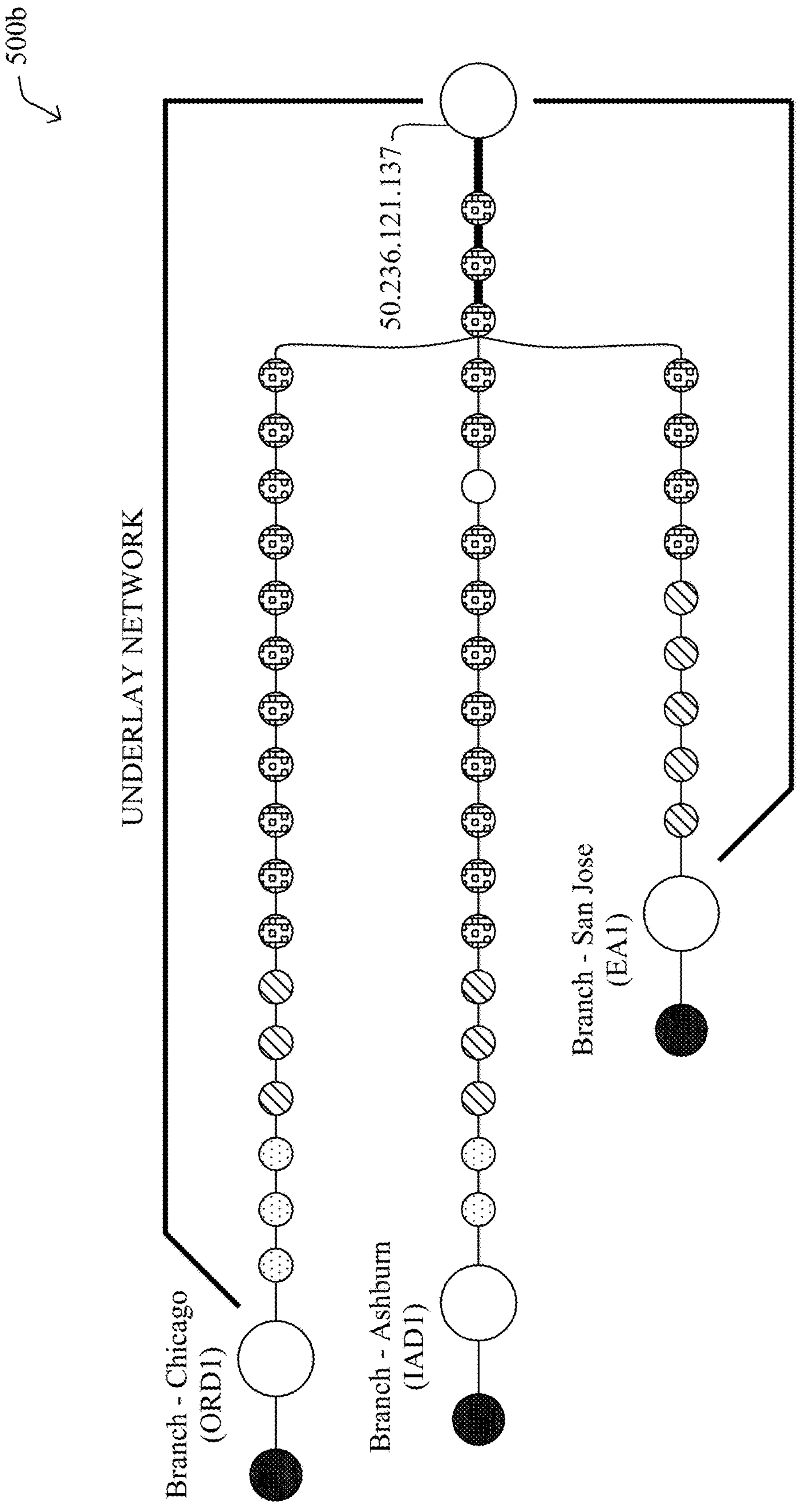

SD-WAN solutions use overlay networks to route traffic based on user-defined policies for a particular application. However, this control and this automation comes at the cost of visibility, as overlays will typically obscure the network underlay. To see the entire network path, as well as its impact on application experience, network monitoring platform users typically configure two tests-one to measure application response times and overlay network performance, and a second to measure and map the underlay network path. For instance, network path visualization 500*a* of FIG. 5A illustrates a default overlay network, while network path visualization 500*b* of FIG. 5B illustrates example results of an additional test to public IP addresses of the remote tunnel endpoint.

Figure 5C:
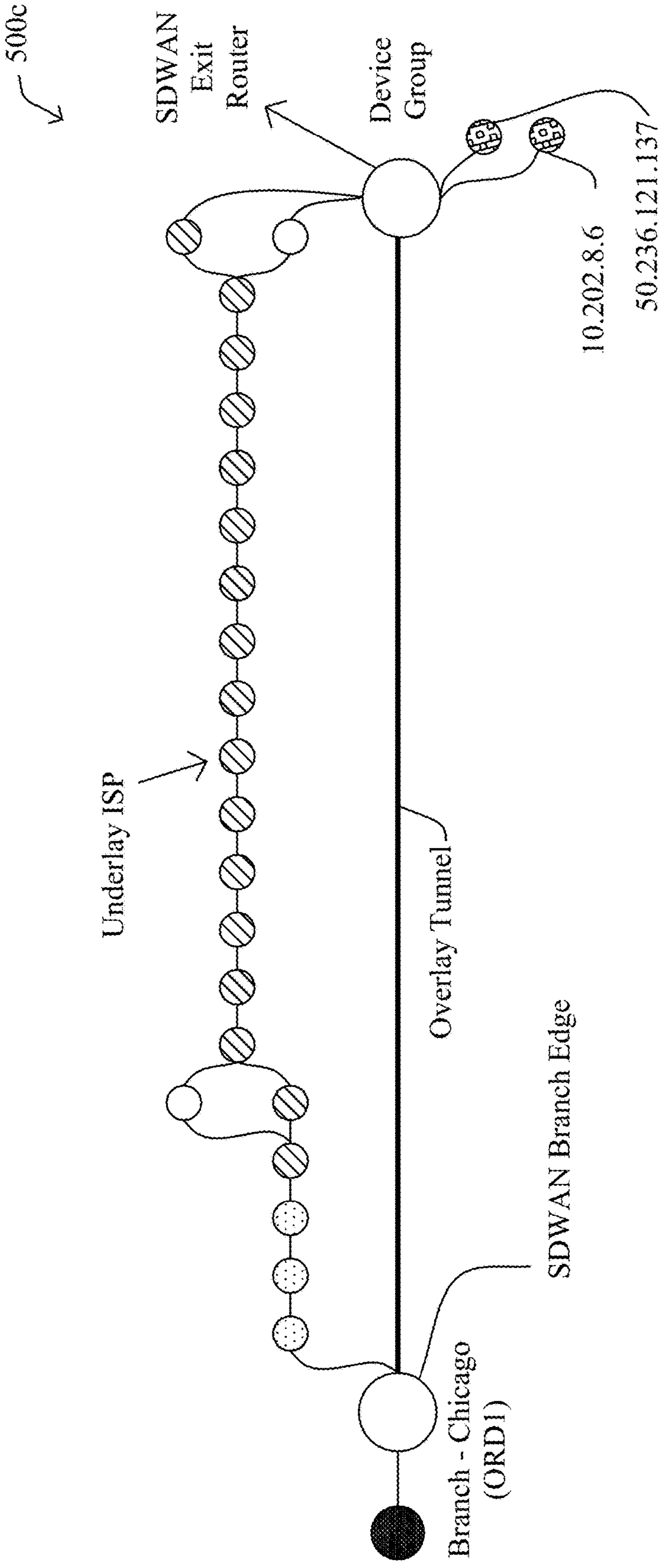

While these independent tests provide the needed visibility, the correlation of application experience to underlying ISP performance requires more intensive analysis across tests today. This is less than ideal, as users need to alternate between tests to understand impact while troubleshooting an operational problem. Multi-service views, as described herein, thus enables these tests to be aggregated into a single view so that overlay and underlay network performance can be easily correlated for rapid problem domain isolation. FIG. 5C, for example, illustrates an SD-WAN Overlay and underlay network with multi-service views, according to the techniques herein.

Notably, the move to SaaS applications has led to a move towards cloud-based secure web gateways (SWG), which inspect web traffic in real-time, analyzing content against corporate policies and ensuring any content that is inappropriate or which contravenes company policy is blocked. SWGs provide benefits for remote workers who could be accessing SaaS applications from anywhere on any device, and SWGs are slowly becoming the standard way of securing SaaS applications, whether remote or on-premises. This extension of the firewall beyond the perimeter of an enterprise's branch means network teams need new ways to monitor this extended network.

Figure 6:
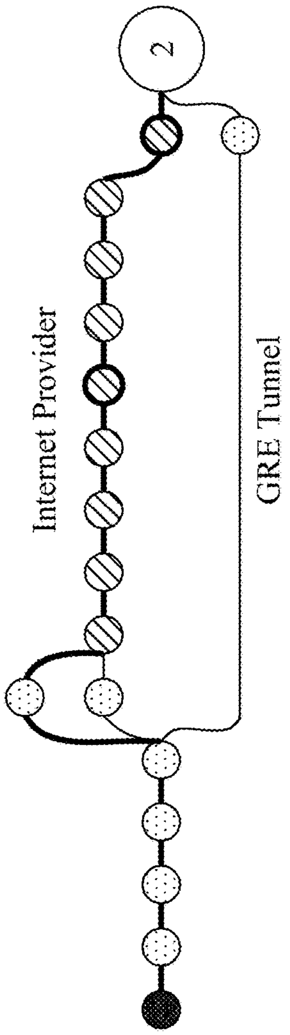
FIG. 6 illustrates an example of a multi-service view in accordance with one or more embodiments described herein.

Two common modes of onboarding a cloud SWG at a branch location are the use of either transparent proxy mode or explicit proxy mode. In transparent mode, branch office traffic is directed to the closest SWG through a GRE or IPsec tunnel configured at the branch edge router. This generally leads to a network blindspot from the branch perimeter to the SaaS application being accessed due to the use of an overlay network and reliance on a public network. As a result, other measurements need to be made to gain back lost visibility. This can be accomplished today by setting up two distinct tests:

1. One test to the application being accessed from the enterprise agent at the branch. Note, in transparent proxy mode, due to the GRE tunnel, the path appears to be in a private network even though the last node segment (10.132.18.10 to 85.88.35.89) is actually traversing a public network.
2. Another test to the transparent proxy IP address using ICMP to bypass the tunnel and discover the underlay network Multi-service views herein make the measurements and network paths of the overlay and underlay network easier to correlate by combining interface nodes that are common across multiple network tests and branching the underlying ISP(s) from the GRE tunnel. FIG. 6 for example illustrates an example of such a cloud proxy network access visualization 600 using multi-service views herein, built similarly to the visualization 500*c* of FIG. 5C above, combining the two tests mentioned above to create the singular view, accordingly.

Figure 7A:
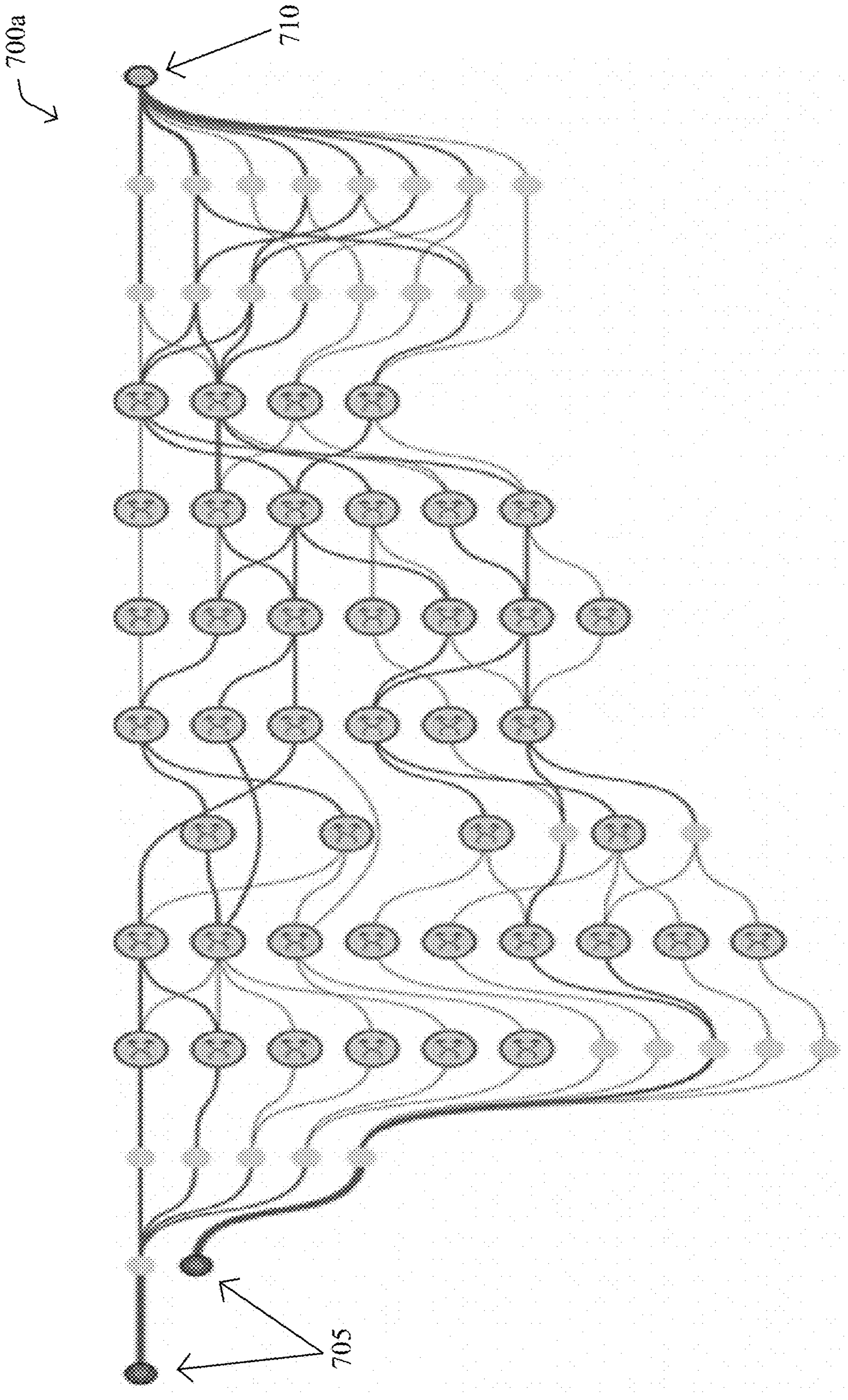
FIGS. 7A-7B illustrate another example of creating multi-service views in accordance with one or more embodiments described herein.
Figure 7B:
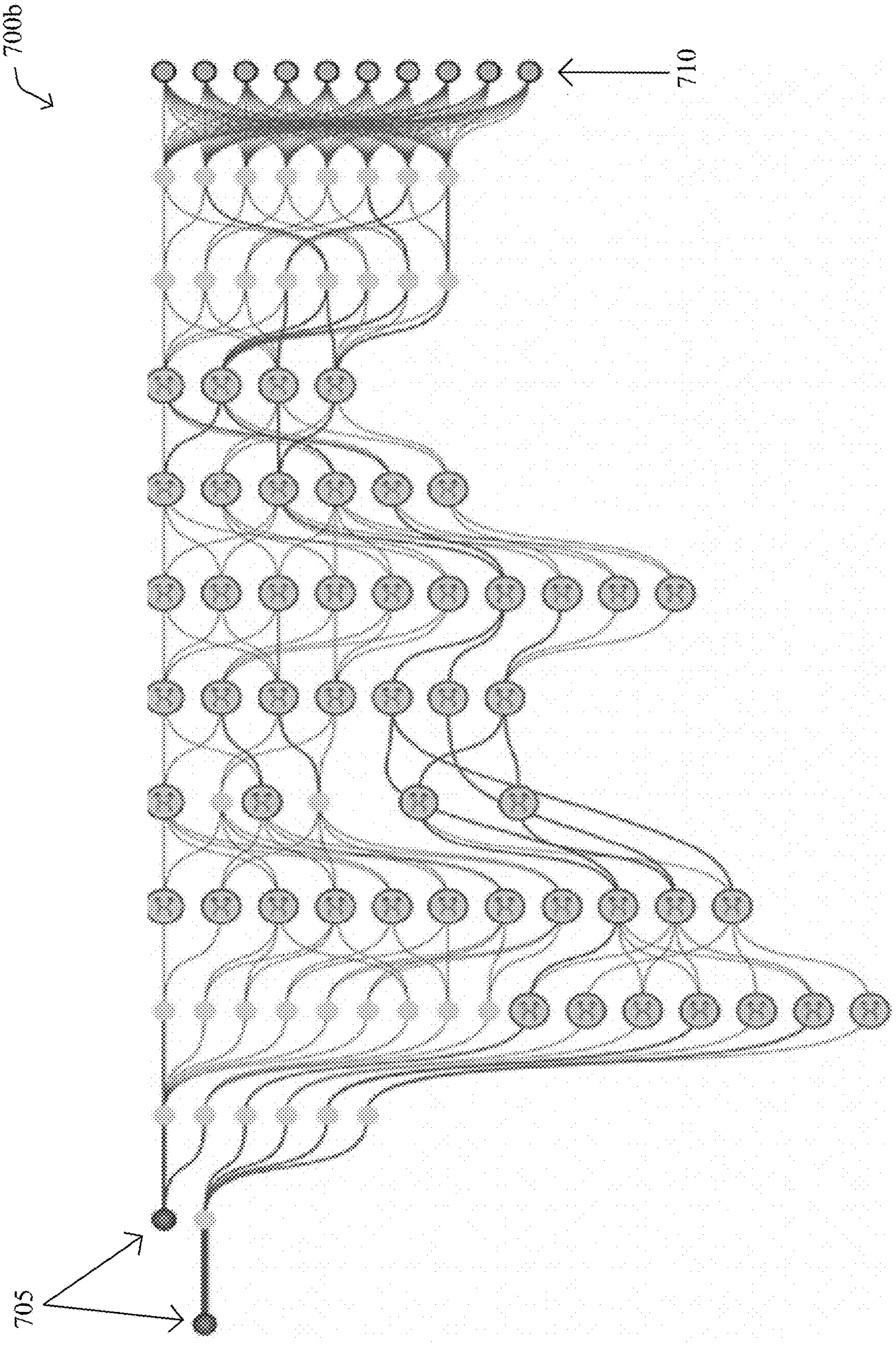

Still another example of a common scenario that presents significant challenges to most enterprises is network path correlation across clustered services. Multi-service views herein also make it much easier for users to see common dependencies and network bottlenecks that impact a set of services. Building upon our unique path visualization, Multi-service views leverages the path building algorithm described herein across multiple networks to build a picture that was previously not possible. FIG. 7A is an example visualization 700*a* of an application being accessed by two data centers 705, i.e., a default network visibility to one of the application pods 710. However, assume this application is served by multiple pods that are load-balanced. For an operations team, it's critical to understand each pod's performance and how any of them may be contributing to user experience issues that surface intermittently only when the faulty pod or its associated network is used to serve the traffic. With Multi-service views, the techniques herein can layer the networks serving each pod from both data centers to build a more complete picture that drastically reduces time to troubleshoot. As shown in FIG. 7B, the visualization 700*b* using multi-service views herein shows network access to all application pods in a single view, showing network access from the two data centers 705 to all application pods 710.

It's important to note the commonalities and differences between the two views in FIGS. 7A-7B above. Four network segments from the right are common across each pod and can be clearly seen as the logical network serving all application pods. Likewise, the first seven segments from the left represent local data center networks accessing each pod with some degree of overlap. This data is captured without any instrumentation on network devices themselves but leveraging the advanced network synthetics herein to weave together data across multiple tests.

Further Details of Multi-Service Views

The above description provides just a few examples of how the multi-service (multi-test) view capability can be used, allowing customers to understand a holistic view of all the paths leading into a particular region or service provider that they're using to serve their user base. For example, multiple Internet providers are used and one of them happens to have a problem, multi-service views can actually correlate this across multiple tasks and see that there's a common denominator (e.g., one issue that's impacting the entire region). Without the techniques herein, users effectively cannot make such a determination without extensive manual exploration.

Figure 8:
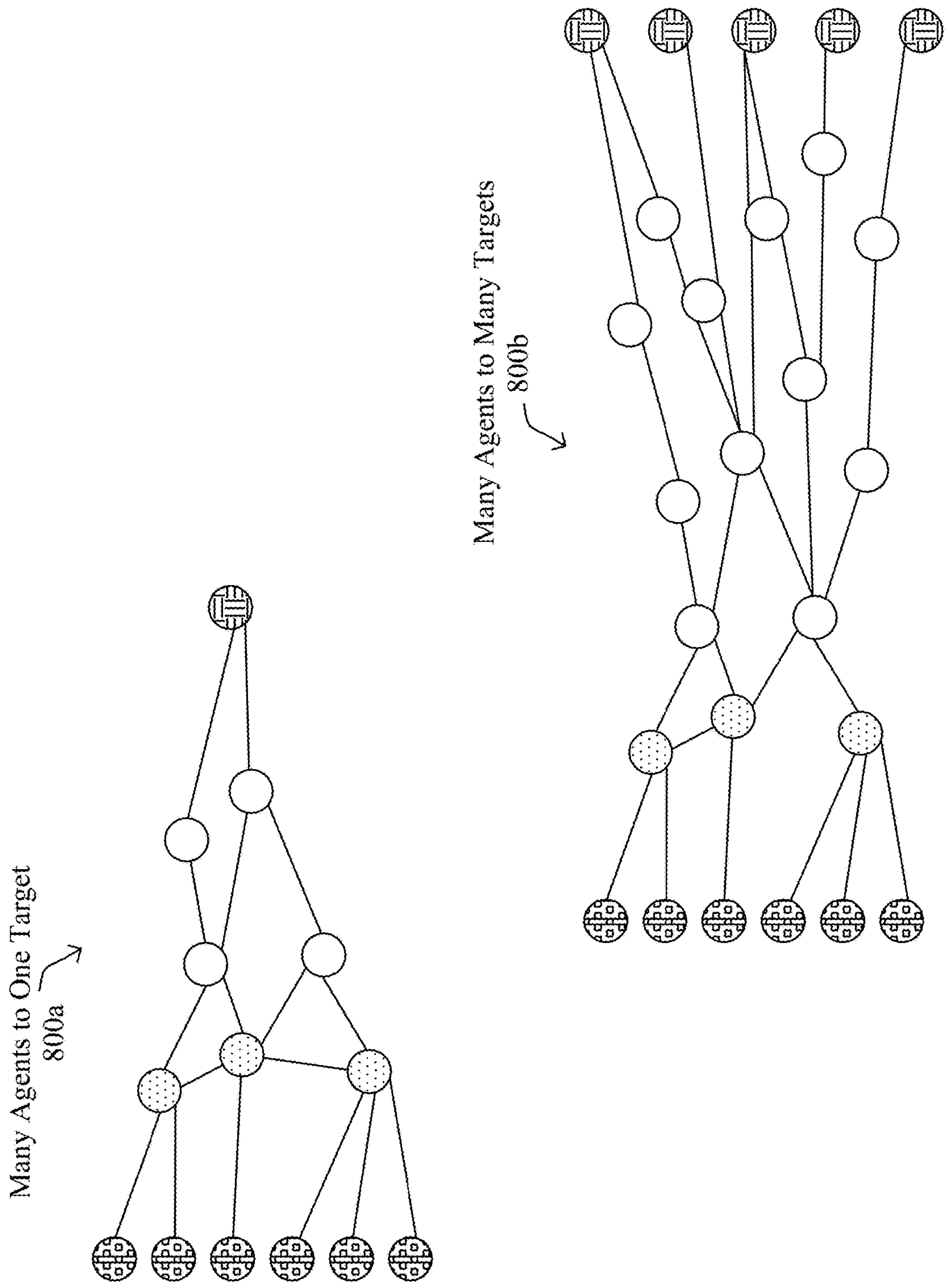
FIG. 8 illustrates examples of different types of agent testing configurations in accordance with one or more embodiments described herein.

To better understand how multi-service views work, the details below will describe how the techniques herein decide what information to aggregate. For example, assuming a graph 800*a* of FIG. 8 of many agents to one target, graph 800*b* of many agents to many targets, one agent to many targets, and so on, how do the techniques herein decide whether to aggregate a particular suite of applications, any selection of tests, all the tests from a particular region regardless of the application (such as to see a network overlay), etc.?

To illustrate this, the following is an example use case of multi-service views. Assume, for example, that a customer may enter their dashboard, and typically what customers do is they create a set of tests. Note that each of these tests may be individual tests (e.g., nine "agent to server" tests) that they're creating, such as, for example, SharePoint is a part of the Office 365 suite, and this example customer has an on-prem deployment of nine different "pods" that serve SharePoint. So the example customer has nine different tests that are effectively being used. Typically, when you look at a single task (e.g., one of the SharePoint tests), what would be shown is the availability to that particular pod from all these locations around the world.

So, in this case, the individual test shows some problems, such as network errors, packet loss, latency, etc., all per pod, and alerts can be set up per pod, and then you can holistically get a better idea if there's a problem (e.g., with SharePoint), is it a particular pod or is it a broader problem across the network that is accessing all of their pods (e.g., that are serving SharePoint).

Path visualization diagrams could show individual pathways to a single pod from each of a plurality of sites across various geographies (e.g., locations such as England, Canada, Thailand, Houston, Brazil, Argentina, etc.). According to the techniques herein, multi-service views allows a visualization UI to show all the tests (e.g., SharePoint tests above) in a single view. For instance, by searching for "sharepoint", all available SharePoint tests may be presented to the user in a drop down box, from which a user may select particular tests to combine into a singular visualization.

That is, as the user adds the tests into their view (e.g., by selecting them), the techniques herein may dynamically start to aggregate the data across all those tests into a singular view, such as where multiple agents from the respective locations show their aggregated test results to each of the selected test destinations (e.g., the same three selected pods).

Figure 9:
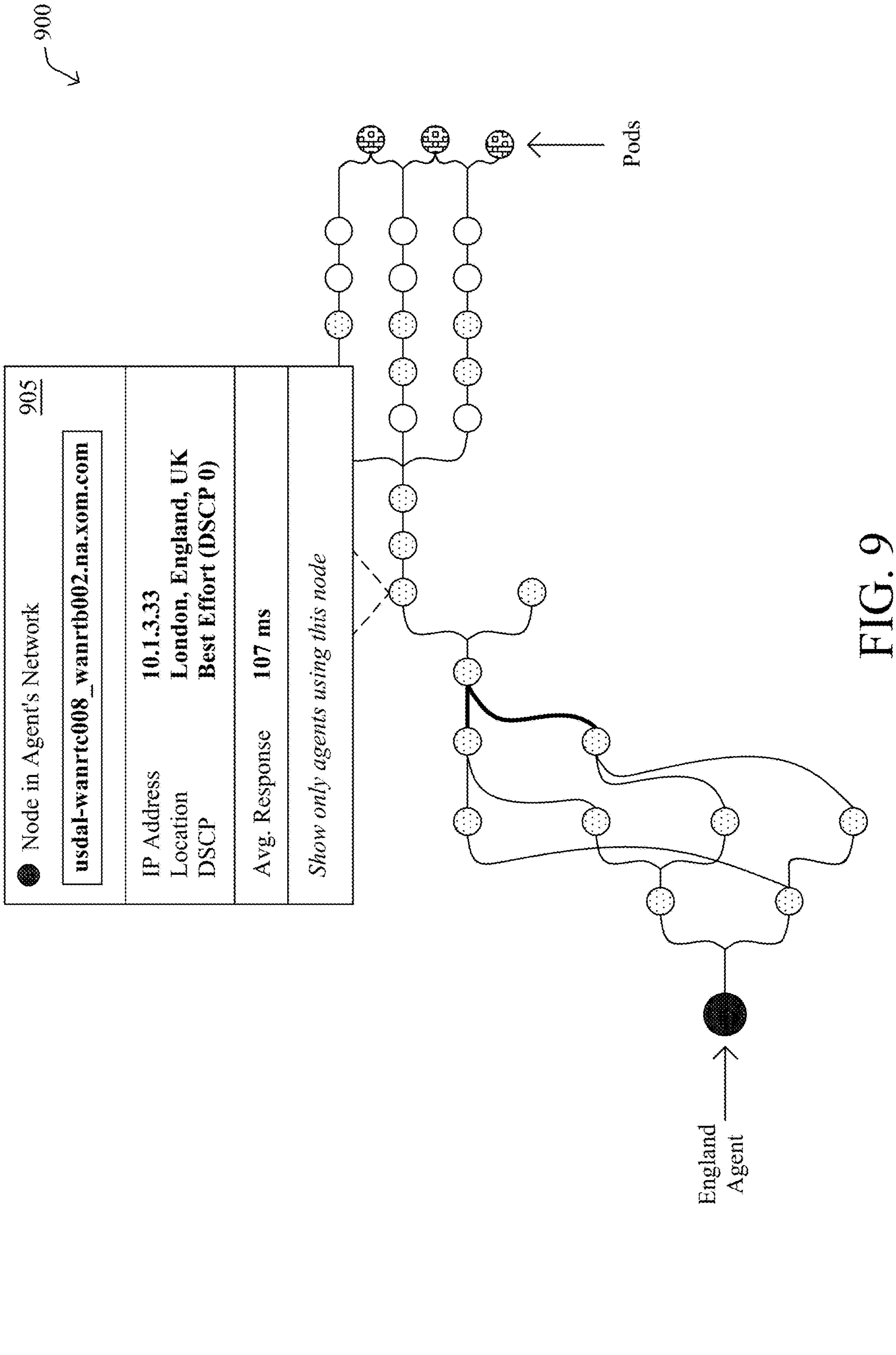
FIG. 9 illustrates another example of a multi-service view in accordance with one or more embodiments described herein.

Now what would be shown above is one overall view of all of the selected tests (e.g., from all agents across three pods selected above), and thus what is the overall picture of health (e.g., of the SharePoint application) across all of these selected tests (e.g., all three of the selected pods). Moreover, if there's a specific problem across one of the tests (e.g., one of the pods), the user may, for example, select a single agent (e.g., in England, as shown in visualization 900 of FIG. 9) to view that specific issue in more detail. For instance, it can now be seen that all three pods are being accessed for the agent in England via a shared middle network (e.g., a WAN) that's providing the access to this part of the network that's serving the pods, highlighted in popup box 905 as shown (e.g., based on a mouseover of a particular node and a corresponding popup information box).

Other graphs may show what the techniques herein may produce in response to a user selecting the view of all of the pods that are being testing (e.g., all nine above). As such, the techniques herein can provide a broader picture of all of the tests (e.g., all nine of the selected pods) being accessed from that particular location/agent. Also, further selection (e.g., clicking, mouseover, etc.) of any particular network element in the graph may also show more specific data relating to that given selection, such as pod-specific characteristics, a highlighted end-to-end path trace, etc.

As an example of how a user could use this consolidated the data to understand, for example, where a problem is across the network (e.g., whether it's an isolated problem or a broader problem), assume that an IT admin is looking to solve a particular problem (e.g., a set of users in this location, in England, complaining that they can't access SharePoint). In order to determine why this particular problem is occurring, the techniques herein can help visualize whether there is a specific pod that's being problematic, or whether it's a hardware issue, or a network issue relating to that pod, etc., or whether it's a local issue specific to that site that's causing it. By viewing all of the selected tests in aggregate, certain diagnostics may become more readily apparent, such as where some problems are seen across all of these tests, rather than only one or some, etc.

This is particularly helpful, that is, since in instances where multiple pods are serving requests (e.g., nine pods possibly service a request to SharePoint from this location, in this example), issues can more easily be located and diagnosed when all possible path traces back to individual pods are seen at once, along with their responses over time, to understand if the problem that the users are seeing is particularly related to one of the pods that could be causing an issue. For example, in this illustration there are nine different pods that are serving the requests, and the techniques herein can show the network that accesses those pods and also the availability of all those pods and their ability to actually serve the content.

Notably, the techniques herein may also automatically discover the endpoints that map to a certain application you want to monitor. For example, if monitoring a DNS service, the techniques herein may first discover all of the servers that are servicing that DNS service by querying DNS records. Similar techniques may also be used for VPNs underlays and HTTP servicing (e.g., based on queries, scanning, data collection over time, etc.). In this manner, a user need not be previously aware of all of the potential end point targets to monitor or all of the intricate dependencies across the network, but may rely on the system herein to present the end points based on a user-facing inquiry (e.g., a URL that is to be monitored being converted via DNS queries to a number of corresponding DNS servers) in order to set up desired tests, accordingly.

Note also that while the examples above have generally shown topology graphs (path visualizations) and their aggregation according to the multi-service view techniques herein, other specific view formats may also be presented according to the techniques herein, such as, for example, global map views of HTTP servers for the selected tests, table views of those HTTP servers, and so on. In other words, the techniques herein appropriately aggregate different tests for different services (and from different agents) into an easy-to-read viewable format, regardless of the particular GUI being displayed.

Regarding the use case around SD-WANs and cloud security mentioned above, when customers re-architect their network they're deploying SD-WAN or cloud security gateways by way of creating tunnels (e.g., "an overlay network"), where these tunnels pipe all traffic from a particular location (e.g., a corporate branch office) to wherever that service is, and then that service will forward the traffic to wherever it needs to go in the Internet or on the local network (i.e., whatever application you want to access). When this configuration is used, however, it increases complexity due to the virtual connections (e.g., to third-party networks or services that the customer may not control).

As such, by using multi-test views, a user can visualize the network of the route across my tunnel through the SD-WAN, through the cloud security gateway, through some SaaS application. Operationally, though, the user would want to know whether there is a problem between their network and this middle-mile service (e.g., SD-WAN service, cloud security gateways, etc. that are causing a problem across the Internet or across that service), and beyond that, is anything causing a problem getting to the SaaS application. In particular, by creating underlay tests according to the techniques herein, and then using multi-test views to put them together, the techniques herein can provide operational knowledge on how a network architecture is actually impacting their end users, and how they access these applications.

As an example of what is achievable in such an SD-WAN scenario, therefore, based on the techniques described herein, assume that a set of tests are established (e.g., overlay and underlay tests), for instance, where there are four example sites that all need to access an application in my data center somewhere. The techniques herein can show whether the connections are acceptable, what is their availability, what's their time to serve requests, etc., so that there can be a better understanding application health. By looking across the network, the user can also understand network health and how that impacts application health, and so on, such as by looking at the network view (path visualization). However, in a typical network visualization view, because of the presence of tunnels, the test essentially appears as a one-hop routes, where network devices and links become hidden. Accordingly, through the techniques herein, the user can add an underlay test to provide the necessary information across this network, i.e., showing what the path overlay and underlay are, such as shown in the visualization 1000*a* of FIG. 10A.

Figure 10A:
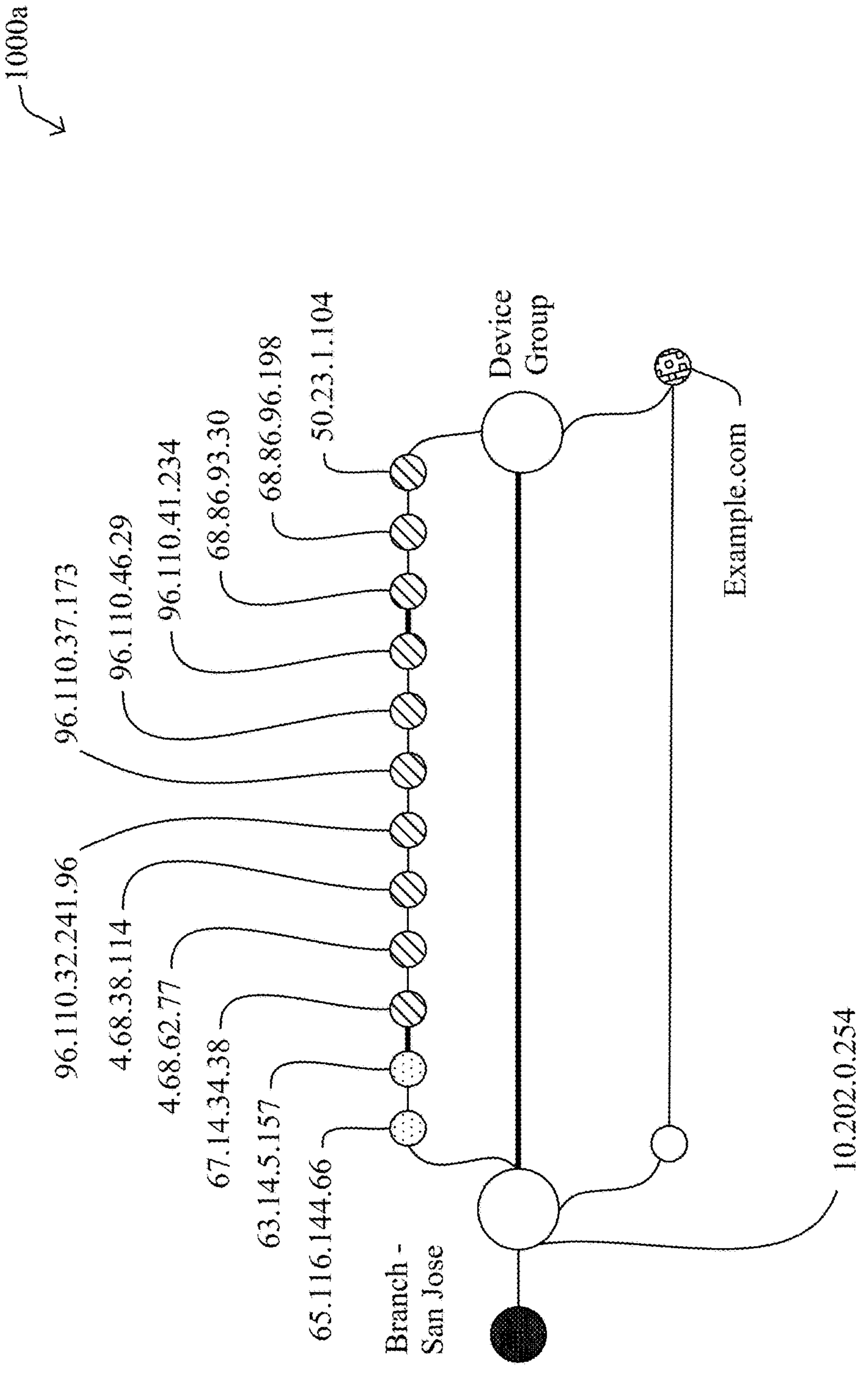
FIGS. 10A-10B illustrate another example of a multi-service view and an expanded multi-service view in accordance with one or more embodiments described herein.
Figure 10B:
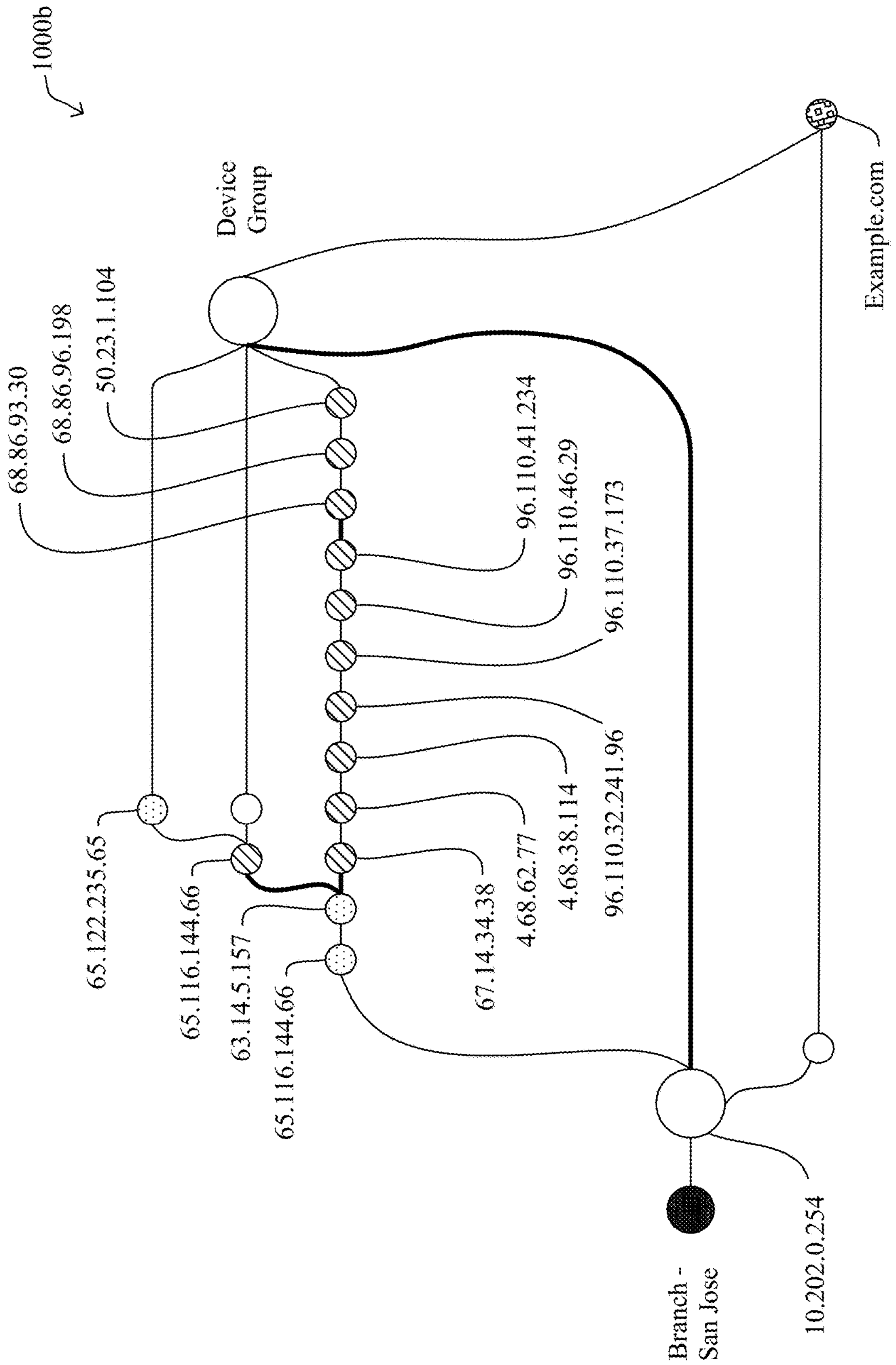

For example, as shown in FIG. 10A, the view shows an application that is being accessed (e.g., example.com), and there is an overlay path and an underlay path, which when stitched together using the multi-service views herein to allow better understanding of application performance problems that may be caused by an underlay issue across the Internet. In other words, the techniques herein provide deep network visibility with expandable and collapsible granularity, which may be performed dynamically at a user's request (on the fly), providing holistic views of intelligently aggregated metrics, accordingly. (See FIG. 10B, for example, of an expanded view 1000*b* of visualization 1000*a* above, created simply by clicking a particular path trace.)

Note further that according to the techniques herein, particularly useful for the overlay and underlay multi-service (multi-test) views, there is intelligence behind the icons of the nodes shown in the UI. For instance, certain nodes may be a dark or light color (e.g., dark blue versus light blue), a different color (e.g., blue versus red), different sizes (e.g., larger or smaller), or a completely different icon (e.g., different shape, different image, etc.). For example, a single darker blue node (currently selected) may represent an overlay, where once the darker blue node is expanded, the lighter blue nodes may then represent individual nodes along the path of the underlay. Also, other types of devices, such as border nodes, may be shown as different icons to further assist in the visualization of multi-test views. The added intelligence behind the graphical representations of the nodes, therefore, helps user to better understand overlay and underlay networks, accordingly. For example, toggling the selection of a device layer view, for example, may provide views that are more insightful of the aggregated data (e.g., showing how a node path is actually a single overlay path).

Note that there are many ways that data aggregation can be beneficial, such as when a user has a broader objective such as simply wanting to know the performance, generally, from a particular location. As such, the techniques herein allow for the selection of a particular location (e.g., a country, a city, a data center, etc.), such that all tests running from that particular site could be displayed and aggregated (e.g., all tests, a portion of tests, etc., as described above), allowing a user to navigate through different levels of visualizations while browsing their overall architecture and associated performance characteristics.

Another way that multi-service views and the data aggregation described herein can be beneficial is to help a customer understand all of their traffic that might traverse network "X", e.g., because the customer has heard that network X is having some issues, and the customer is interested in seeing how their networks may be affected by network X. In other words, the techniques herein may mine the customer's own test data and then help the customer filter the test data to show an aggregated view of the tests over that particular network X, accordingly.

Similarly, according to one or more embodiments herein, in addition to network-level filtering, the techniques herein may also group tests according to traversal of any particular network element (e.g., node, router, link, service, etc.). For instance, if a user is seeing a particularly problematic element (e.g., a device dropping traffic), the techniques herein would allow that user to select that network element and request that all tests traversing that element be grouped into a single aggregate view for investigation.

Furthermore, according to one or more embodiments herein, the multi-service views herein may also allow for customized test groupings and associated aggregation, such as by allowing customers to define a group label and to map associated tests to that label (e.g., in ways that make sense to the customer). In this manner, by clicking on a labelled group, all tests associated with that group label can be shown and aggregated (e.g., alone or in combination with other selected tests).

Figure 11A:
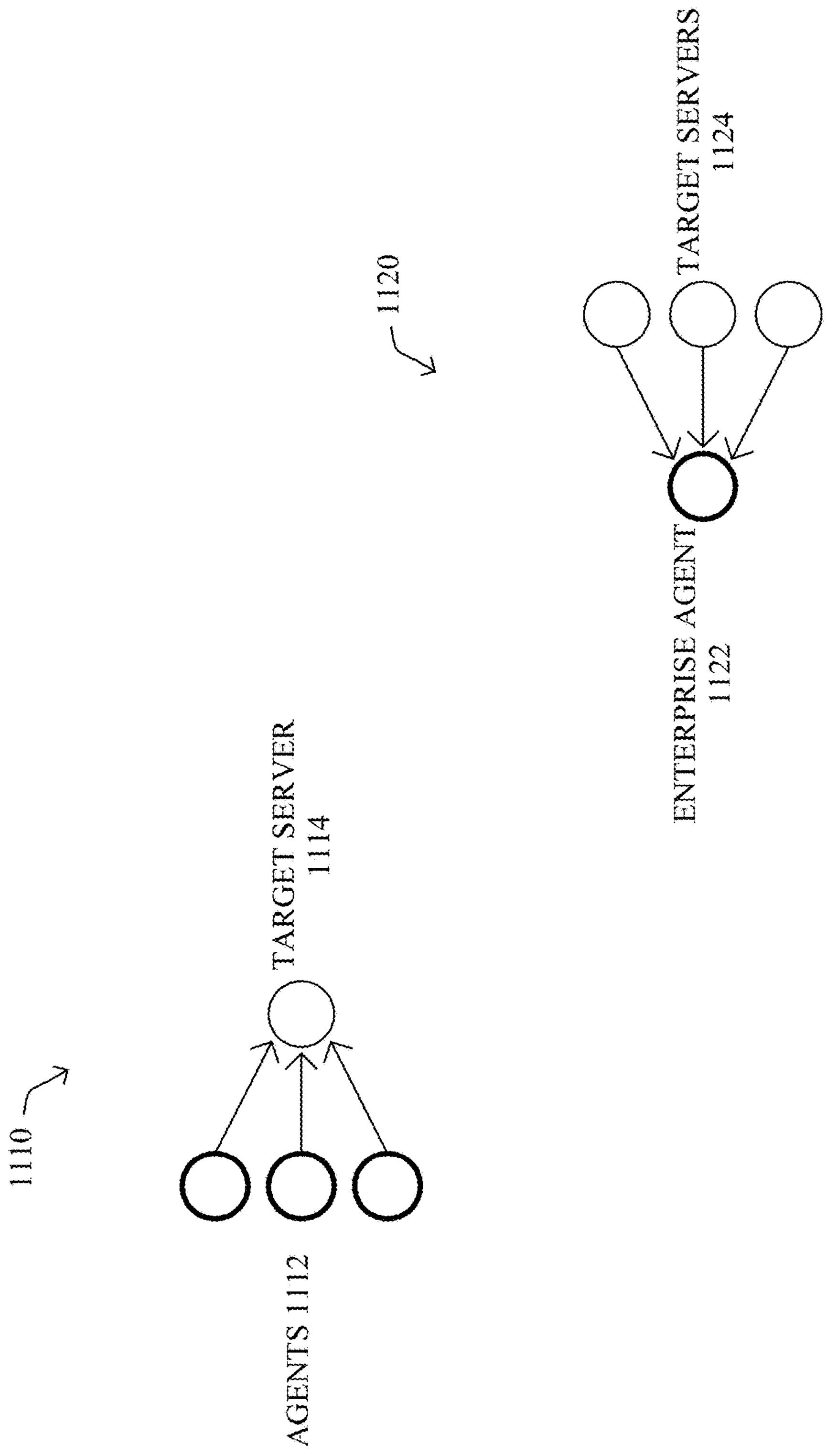
FIGS. 11A-11B illustrate further examples of different types of agent testing configurations in accordance with one or more embodiments described herein.

Notably, as shown in FIG. 11A, prior network monitoring efforts have historically been based on tests from many agents 1112 (e.g., different locations) to one target 1114, to test the performance of that target for the many different agents, as shown in graph 1110. However, it is important to note that the multi-service views herein provide greater visualization for at least four different testing architectures. The first of which is multi-server (one agent to multiple servers), such as for an application being served by multiple HTTP/DNS servers as shown in graph 1120. For instance, this is a composite test where the techniques herein aggregate multiple targets 1124 under a same multi-target test from an agent 1122 (e.g., an enterprise agent). Examples can be multiple web servers serving a single URL behind a load balancer, multiple name servers resolving a domain name, multiple BGP prefixes, an app that is federated across multiple domains, dual-stack tests, e.g. ipv4+ipv6 tests to same dual-stack endpoints, and so on.

The multi-target composite test herein has a UI that allows users to:

- Set the type of test (e.g., network, web/http server, routing, DNS/DNS server, etc.)
- Define the list of targets of the test.
- Define the common options (and advanced options) of the test, that are going to be shared by all the targets (including frequency and source agents)
- A view that shows the time-series of the aggregate of all targets and the ability to select a specific target from the dropdown Supported tests under this testing architecture may comprise such things as, for example:

- Http server tests: the ability to define a list of URL-IP address tuples; the techniques herein have the ability of "forcing" DNS resolution to address monitoring cases of load balancers with multiple instances under it.
- DNS server tests: where each target is a name server.
- Network (agent-to-server, agent-to-agent) tests: the ability to define multiple targets that can be either servers or other agents; the techniques herein also support bi-directional one-way tests for agent-to-agent.
- Routing: the ability to configure multiple BGP prefixes in a test; note that when you configure the previous tests the techniques herein also add implicit BGP tests underneath.

Regarding dependency between layers, such as the "implicit test" just mentioned, when configuring multi-target tests on a layer the techniques herein automatically add implicit tests under that layer. That is, since testing a particular layer may result in unique targets under that layer, the techniques herein can show the aggregate time series of all the targets in the layer below. For example if an HTTP multi-target test is configured and there are two network targets underneath, then the techniques herein can show the aggregate of the two network targets, accordingly.

Views of this testing architecture may be modeled to have a target selector (e.g., "server" or, more broadly, "target"), as well as an "all targets" option to show the aggregate view across all the targets. This selector (individual, subset of, or all targets) is carried between view options (e.g., network view, BGP view, etc.). For example, in path visibility mode, the techniques herein can show the union set of all paths when in aggregate mode for the specific target/server. Aggregated metrics may thus comprise either combined totals, aggregated ratios, average values, overall max/min values, and so on, from all of the aggregated data sets.

The techniques herein also provide a special alert type for composite alerts to allow specification of specific targets within a multi-service view test, and also allow users to define alerting on the aggregate. For example, this may be accomplished by adding a "composite" type to the alerts which can apply to HTTP, DNS, network, and routing layers. (There are a number of use cases that the techniques herein cover from the perspective of alerting, and those mentioned are merely examples.)

Figure 11B:
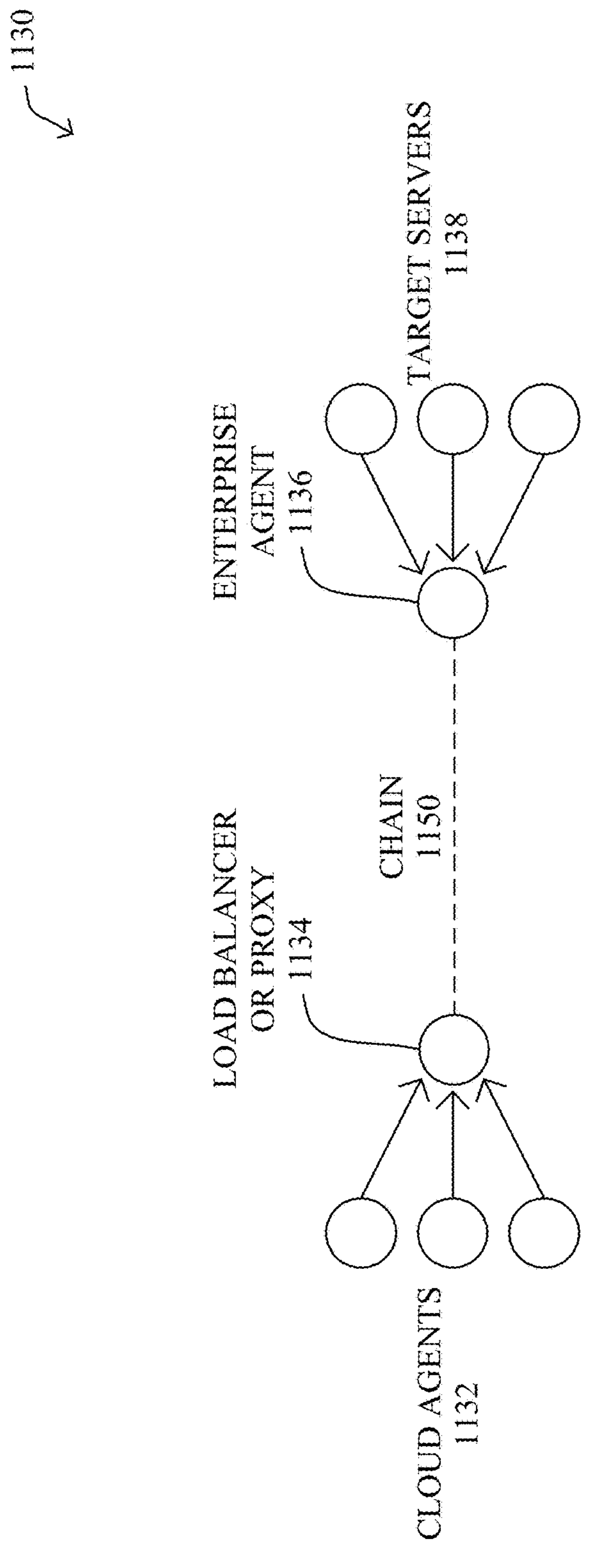

A second architecture (shown in graph 1130 of FIG. 11B) expands multi-service views to a combination of the multi-server test above with the traditional tests (multi-agent) where the source of the test and the destination are somehow linked to each other, such as through various load balancers or proxies. For example, multiple cloud agents 1132 can test to a load balancer or proxy 1134, which through chaining 1140, can reach an enterprise agent 1136 to test target servers 1138, accordingly.

In particular, a "chain test" herein is essentially stitching two tests together for the purpose of visualization and aggregating end-to-end metrics. One example of a chain test is an agent-to-agent test, which may be considered a chain between a one-way test from agent "A" to agent "B" and one-way test from B to A. In the UI the techniques herein have the ability to select the aggregate of the chain (both ways) or to select a specific segment of the chain (direction A→B or B→A). Notably, in one embodiment herein, the UI may be configured to allow a user to drag the visualization of one test (e.g., onto a whiteboard space or grid) to connect it to another test, particularly where the two tests share at least one common (e.g., central) element, such that the techniques herein establish the stitching necessary to combine the two tests, accordingly. (Illustratively, multiprotocol chain tests may also be allowed herein, e.g., a test running both TCP/80 and ICMP, so long as all of the targets of a given side of the test are elements of a same "cluster" that serve an application.)

The chain composite test, in particular, illustratively has a UI that allows users to set the type of test (network, web/http server (such as for cases of proxies), and so on), and to define a single-target test for the "left" part of the chain and a single source single/multi-target test for the "right" part of the chain (which, in general, would be an agent, such as an enterprise agent). That is, supported tests on the chain left side (single target) may comprise:

- Http server;
- Network/agent-to-server; and
- Network/agent-to-agent, while supported tests on the chain right side (single source) may comprise:

- Multi/single target HTTP server;
- Multi/single target network/agent-to-server; and
- Multi/single target network/agent-to-agent.

(Note that one objective of stitching agent-to-agent to an agent-to-agent test ("a2a→a2a") may be particularly beneficial in cases where there is "triangle routing" through a specific point, e.g. via a VPN, and the tests may be correspondingly configured to force traffic to go through a concentration point.)

Views of this testing architecture may provide extra selectors for:

- Chain side: present all the time, allows selection of Left, Right, or Both Sides of the chain.
- Target: when right side is multi-target.
- Direction: when in a network/BGP layer view and any one of the tests is agent-to-agent.

Note that when the selected side is "Both sides" and HTTP metrics being displayed, the techniques herein can use the metrics from the Left side of the chain, otherwise for other metrics (e.g., network, etc.), the techniques herein may display an aggregate view. In addition, certain metric aggregation for chain-based tests may be based on simple averages across the chains, but others may also include more complex calculations (or may be unavailable if no sensible aggregate metric is worth calculating at the chain-test scale).

Alertable metrics for chain-based tests (e.g., standard network metrics) may be based on accessing the time-series of individual sub-tests as if they were normal tests, and associated alert rules on those tests, accordingly. For example, any one latency above a maximum, any one node with a packet loss greater than some threshold, any one server that is non-responsive, and so on. In other words, alerting may be based on individual tests and associated metrics, or on the chain-based test only where such metrics are aggregated and alertable.

Figure 12:
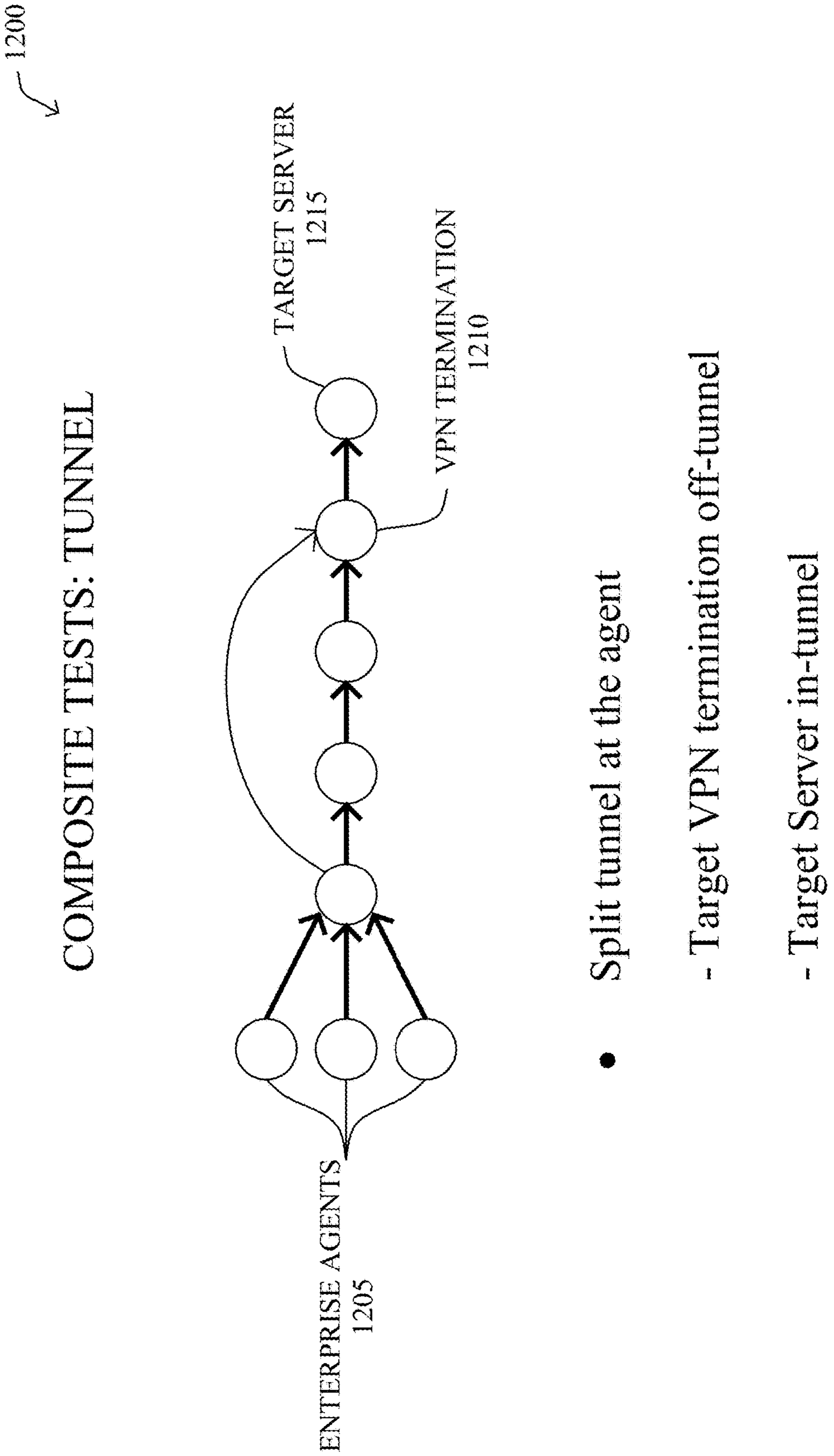
FIG. 12 illustrates another example of a type of agent testing configuration in accordance with one or more embodiments described herein.

Still another architecture of multi-service views, as described above, is the tunnel VPN (graph 1200 of FIG. 12), where the techniques herein have the overlay and the underlay in the same test, to understand where the problem is on the underlay (e.g., when monitoring a VPN). As shown, for example, enterprise agents 1205 may have both a tunnel to a VPN termination device 1210 ("in-tunnel"), or standard connectivity ("off-tunnel") to reach target server 1215. (Note this model was further explained in detail above.)

Figure 13:
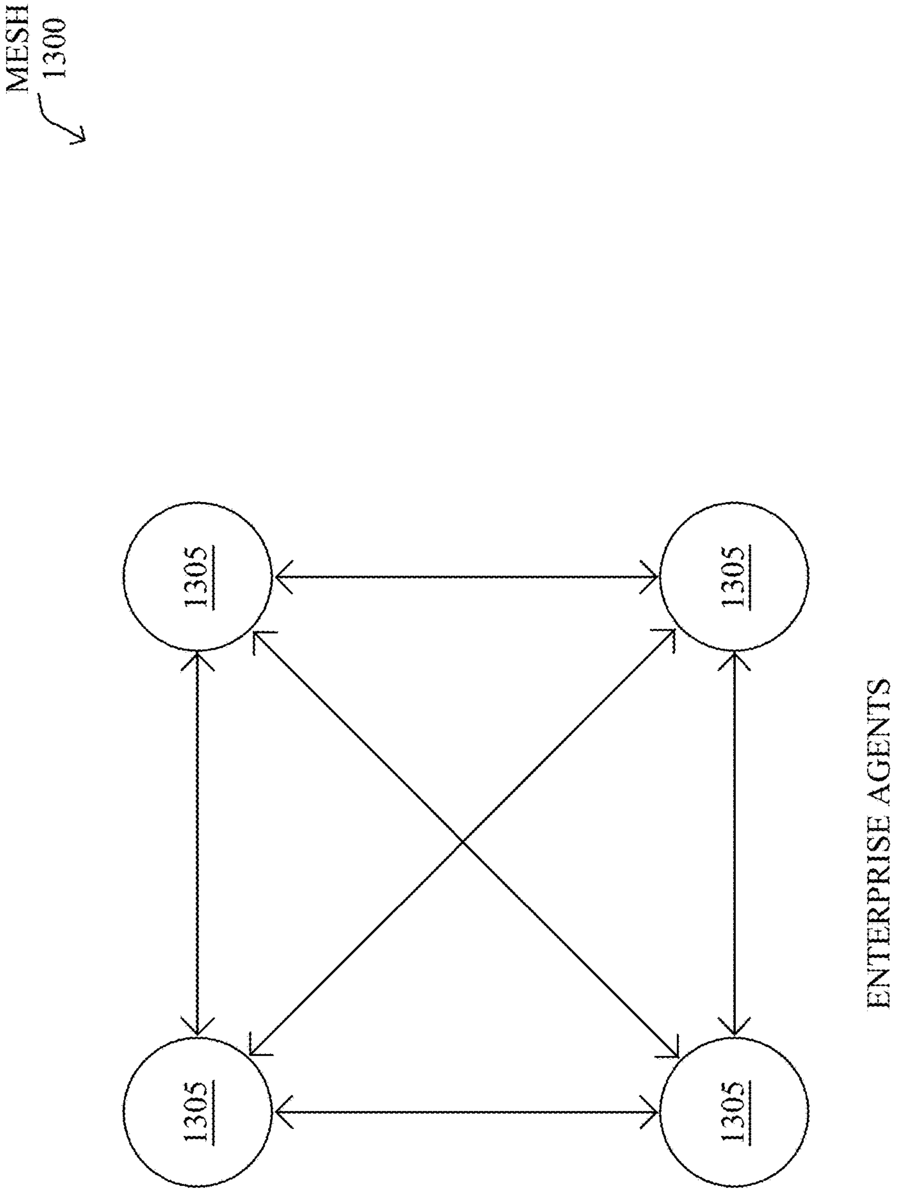
FIG. 13 illustrates another example of a type of agent testing configuration in accordance with one or more embodiments described herein.

A fourth example architecture that may be tested herein is there case where a customer has a mesh network 1300, as shown in FIG. 13, for example, a WAN (wide area network), with agents 1305 in all of the branches, and the customer wants to monitor the entire mesh. For example, when given N enterprise agents in a mesh, a mesh-based test may be composed of a set of N "tests", one per target agent, where each test has N−1 sources and one target (e.g., network/agent-to-agent tests).

Views of mesh testing architecture may show the aggregate of all the N "tests" in terms of network metrics (e.g., average loss, average latency, average jitter, average throughput, etc.), and the ability to show the time series to an individual agent in the mesh. Path visibility views herein may merge all tests or have a selector to filter the sub-test the user wants to see (e.g., one sub-test per agent in the mesh).

Note that a large mesh configuration may significantly impact the utilization on an agent (particularly when customer opts to enable throughput testing). As such, the techniques herein may first identify the capability of all involved agents to run all the tests before enabling a "create test" button. For example, an N-agent mesh will create N*(N−1)/2 tests, so a 4-agent mesh is 6 bidirectional tasks, where a 10-agent mesh is 45 bidirectional tasks. Accordingly, to prevent over utilizing agents for tests, the techniques herein may restrict the breadth of mesh testing to only use certain sub-elements of network tests.

The techniques herein also provide an ease of sharing a multi-test view, where a user may share a particular snapshot of data (e.g., a certain moment in time, a certain window in time, etc.), along with optional accompanying messages and other information. The techniques herein may then generate a link (e.g., public or private) to send the snapshot to anyone for collaboration, where accessing the link brings up the stored tests/views/configurations.

Actionable items according to the techniques herein may be to visually display the multi-service views in a GUI, as shown in detail above, or also to generate various reports, alerts/alarms, and so on, including alerting based on anomalous behavior across multi-test views (e.g., using machine learning based detection). These reports, for example, may be shared through creation of a snapshot (e.g., an image of the network and metrics at a given time) or else as a configuration of tests to auto-configure another admin's view of real-time test data. For instance, assume a user has a problem that they can see across multiple tests, but they may not be the one who can actually fix it (e.g., either not their network, not their knowledge base, not their permissions, etc.), even though it impacts their users. As such, the techniques herein allow the user to share the report (e.g., the snapshot and/or the test configuration/view) with one or more other people who may be able to assist in addressing the issue (i.e., so they can see exactly what the user is seeing). In this manner, the techniques herein minimize the communication "back and forth" between different users, alleviating having to redefine a view, a test, a point in time, and so on.

Advantageously, the techniques herein provide multi-service views (multi-test views) for network monitoring visualization, particularly to manage complex, hybrid digital ecosystems. Network correlation across multiple tests is immensely valuable, and it is powerful to show clusters of multiple current tests (e.g., using device grouping to consolidate nodes). That is, the techniques herein allow customers to clearly see the network connecting a plurality of pods in a single view, where adding tests together builds a picture, illustrating a better profile of what's happening in a given environment. Moreover, the techniques herein can be used to identify, for example, a latency increase impacting all servers in the data center, or other correlated problems, such as seeing an inter-datacenter link saturation issue within the device layer.

Said differently, the techniques herein allow users to determine overall health of a network with more coverage and more precision to find problems, and to locate the true root cause of complex issues, such as whether the issue is in their own network, the service provider, somewhere else in the network, or the application itself. The techniques herein then intelligently display this information in an understandable manner, which includes alerting and reporting features.

Note that while the techniques above describe internal testing (e.g., testing performed by the network monitoring platform itself) being included in the multi-test views herein, other embodiments may provide an interface to third-party testing to further aggregate information from those tests/reports into the multi-test views herein, accordingly.

Figure 14:
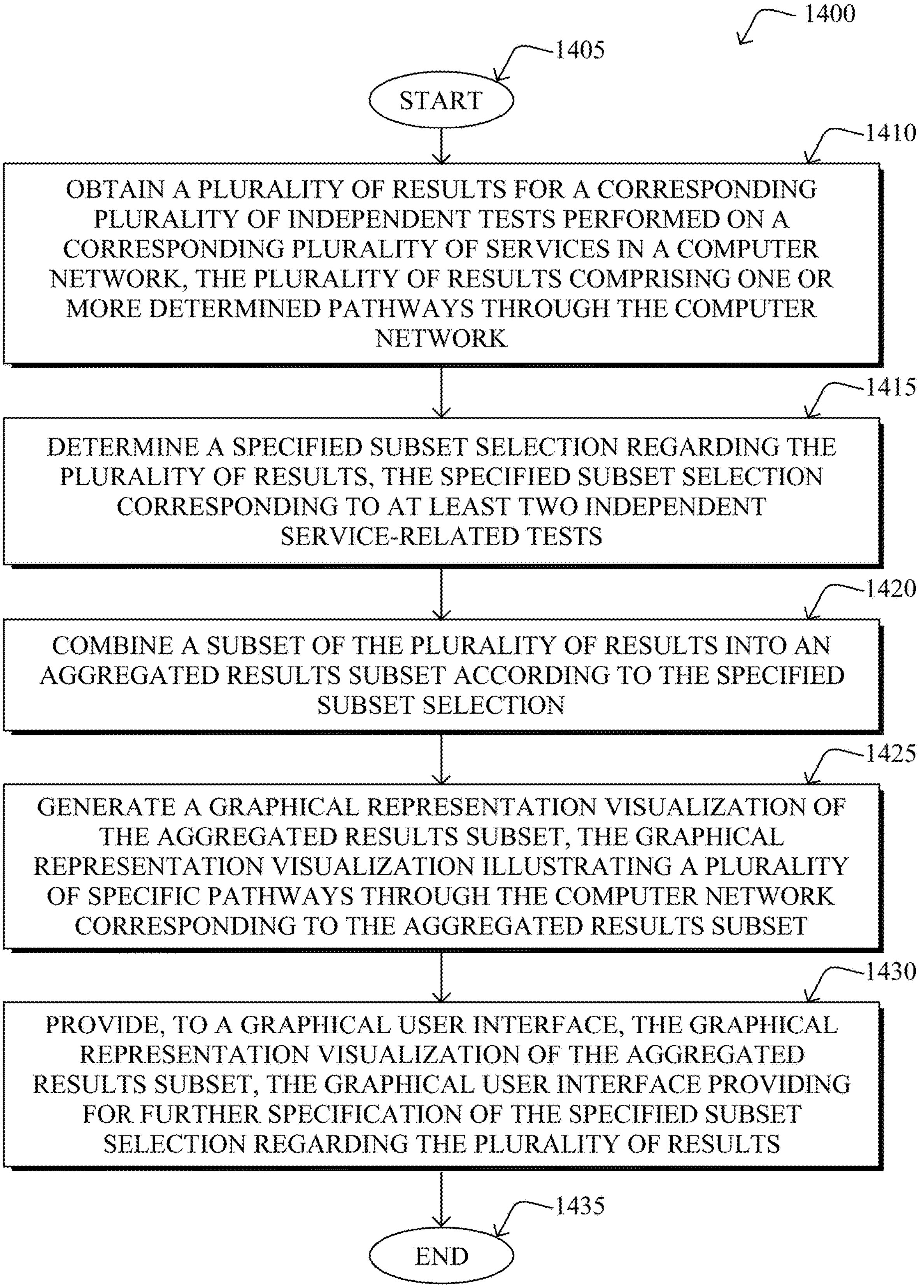
FIG. 14 illustrates an example simplified procedure for multi-service views (multi-test views) for network monitoring visualization in accordance with one or more embodiments described herein.

In closing, FIG. 14 illustrates an example simplified procedure for multi-service views (multi-test views) for network monitoring visualization, in accordance with one or more embodiments described herein. For example, a non-generic, specifically configured device (e.g., device 200) may perform procedure 1400 by executing stored instructions (e.g., process 248). The procedure 1400 may start at step 1405, and continues to step 1410, where, as described in greater detail above, the techniques herein obtain a plurality of results for a corresponding plurality of independent tests performed on a corresponding plurality of services in a computer network, the plurality of results comprising one or more determined pathways through the computer network and, in one embodiment, one or more determined performance metrics of the one or more determined pathways through the computer network. As noted above, the corresponding plurality of independent tests may be performed on the corresponding plurality of services from a plurality of dispersed agents, may comprise a plurality of different types of tests, and so on.

In step 1415 the techniques herein may further determine a specified subset selection regarding the plurality of results, the specified subset selection corresponding to at least two independent service-related tests. That is, as described above, a user (or otherwise) may make such a "specified subset selection" based on selections such as, e.g., geo locations, services, servers, domains, data centers, network devices, network overlays, network underlays, logical network entities, applications, address prefixes, autonomous systems, service providers, subservices, microservices, users, groups, organizations, test agents, and so on. Essentially, the desired visualizations are selected based on all of the available data, such as particular test sites, particular servers or pods, particular services, and so on, as detailed in the examples above.

According to the techniques herein, in step 1420 a portion of the plurality of results may then be strategically combined into an "aggregated results subset" according to the specified subset selection (e.g., where any associated performance metrics can thus become combined totals, aggregated ratios, average values, overall maximums and/or minimums, and so on). For instance, overlapping pathways for the selected subsets, such as overlays and underlays, multiple agent sites, pathways from a single agent to multiple servers/services, and so forth, can be assembled in step 1420 as described above.

In step 1425, the techniques herein may then generate a "graphical representation visualization" of the aggregated results subset (e.g., graphs as shown above), the graphical representation visualization illustrating a plurality of specific pathways through the computer network corresponding to the aggregated results subset (e.g., and associated performance metrics corresponding to the aggregated results subset). In step 1430, the techniques herein may then provide, to a graphical user interface, the graphical representation visualization of the aggregated results subset, the graphical user interface providing for further specification of the specified subset selection regarding the plurality of results. For instance, the graphical user interface may have one or more drop down menus, selectable filters, radio buttons, query/search fields, and so on to allow a user to make such specifications to further adjust the views shown by the generated visualizations. Also, as noted above, the graphical user interface may provide for further specification of the specified subset selection regarding the plurality of results through expansion and collapsing of objects within the graphical representation visualization of the aggregated results subset (e.g., clicking on nodes, links, objects, paths, locations, and so forth).

The procedure 1400 may then end in step 1435, notably with the ability to continue ingesting and processing data. Other steps may also be included generally within procedure 1400, such as, e.g., alerting based on thresholds applied to the certain performance metrics corresponding to the aggregated results subset; generating a shareable snapshot report based on the aggregated results subset according to the specified subset selection; highlighting one or more particular pathways through the computer network from the plurality of specific pathways based on a selected object within the aggregated results subset and the one or more particular pathways traversing the selected object; and so on as described above.

It should be noted that while certain steps within procedure 1400 may be optional as described above, the steps shown in FIG. 14 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Illustratively, the techniques described herein may be performed by hardware, software, and/or firmware, such as in accordance with the illustrative multi-service views process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the process 248.

According to the embodiments herein, an illustrative method herein may comprise: obtaining, by a process, a plurality of results for a corresponding plurality of independent tests performed on a corresponding plurality of services in a computer network, the plurality of results comprising one or more determined pathways through the computer network; determining, by the process, a specified subset selection regarding the plurality of results, the specified subset selection corresponding to at least two independent service-related tests; combining, by the process, a portion of the plurality of results into an aggregated results subset according to the specified subset selection; generating, by the process, a graphical representation visualization of the aggregated results subset, the graphical representation visualization illustrating a plurality of specific pathways through the computer network corresponding to the aggregated results subset; and providing, from the process to a graphical user interface, the graphical representation visualization of the aggregated results subset, the graphical user interface providing for further specification of the specified subset selection regarding the plurality of results.

In one embodiment, the plurality of results further comprise one or more determined performance metrics of the one or more determined pathways through the computer network, and wherein the graphical representation visualization further illustrates certain performance metrics corresponding to the aggregated results subset. In one embodiment, the certain performance metrics are selected from a group consisting of: combined totals; aggregated ratios; average values; overall maximums; and overall minimums. In one embodiment, the method further comprises: alerting based on thresholds applied to the certain performance metrics corresponding to the aggregated results subset.

In one embodiment, the specified subset selection is based on one or more selections selected from a group consisting of: geo locations; services; servers; pods; domains; data centers; network devices; network overlays; network underlays; logical network entities; applications; address prefixes; autonomous systems; service providers; subservices; microservices; users; groups; organizations; and test agents.

In one embodiment, the graphical user interface provides for further specification of the specified subset selection regarding the plurality of results through expansion and collapsing of objects within the graphical representation visualization of the aggregated results subset.

In one embodiment, the corresponding plurality of independent tests are performed on the corresponding plurality of services from a plurality of dispersed agents.

In one embodiment, the corresponding plurality of independent tests comprise a plurality of different types of tests.

In one embodiment, the method further comprises: highlighting one or more particular pathways through the computer network from the plurality of specific pathways based on a selected object within the aggregated results subset and the one or more particular pathways traversing the selected object.

In one embodiment, the method further comprises: generating a shareable snapshot report based on the aggregated results subset according to the specified subset selection.

According to the embodiments herein, an illustrative tangible, non-transitory, computer-readable medium herein may have computer-executable instructions stored thereon that, when executed by a processor on a device, may cause the device to perform a method comprising: obtaining a plurality of results for a corresponding plurality of independent tests performed on a corresponding plurality of services in a computer network, the plurality of results comprising one or more determined pathways through the computer network; determining a specified subset selection regarding the plurality of results, the specified subset selection corresponding to at least two independent service-related tests; combining a subset of the plurality of results into an aggregated results subset according to the specified subset selection; generating a graphical representation visualization of the aggregated results subset, the graphical representation visualization illustrating a plurality of specific pathways through the computer network corresponding to the aggregated results subset; and providing, to a graphical user interface, the graphical representation visualization of the aggregated results subset, the graphical user interface providing for further specification of the specified subset selection regarding the plurality of results.

Further, according to the embodiments herein an illustrative apparatus herein may comprise: one or more network interfaces to communicate with a network; a processor coupled to the network interfaces and configured to execute one or more processes; and a memory configured to store a process executable by the processor, the process, when executed, configured to: obtain a plurality of results for a corresponding plurality of independent tests performed on a corresponding plurality of services in a computer network, the plurality of results comprising one or more determined pathways through the computer network; determine a specified subset selection regarding the plurality of results, the specified subset selection corresponding to at least two independent service-related tests; combine a subset of the plurality of results into an aggregated results subset according to the specified subset selection; generate a graphical representation visualization of the aggregated results subset, the graphical representation visualization illustrating a plurality of specific pathways through the computer network corresponding to the aggregated results subset; and provide, to a graphical user interface, the graphical representation visualization of the aggregated results subset, the graphical user interface providing for further specification of the specified subset selection regarding the plurality of results.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller", those skilled in the art will appreciate that agents of the network/application intelligence platform (e.g., application agents, network agents, enterprise agents, cloud agents, endpoint agents, etc.) may be considered to be extensions of the server (or controller) operation, and as such, any process step performed "by a server" need not be limited to local processing on a specific server device, unless otherwise specifically noted as such. Furthermore, while certain aspects are described as being performed "by an agent" or by particular types of agents, the techniques may be generally applied to any suitable software/hardware configuration (libraries, modules, etc.) as part of an apparatus or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:

obtaining, by a process, a plurality of results for a corresponding plurality of independent tests performed on a corresponding plurality of services in a computer network, the plurality of results comprising one or more determined pathways through the computer network;

determining, by the process, a specified subset selection regarding the plurality of results, the specified subset selection corresponding to a single target test and a single source test from the corresponding plurality of independent tests;

combining, by the process, a portion of the plurality of results that correspond to the single target test and the single source test based on a node common to the single target test and the single source test into an aggregated results subset according to the specified subset selection;

generating, by the process, a graphical representation visualization of the aggregated results subset, the graphical representation visualization illustrating a plurality of specific pathways through the computer network corresponding to the aggregated results subset; and providing, from the process to a graphical user interface, the graphical representation visualization of the aggregated results subset, the graphical user interface providing for further specification of the specified subset selection regarding the plurality of results.

2. The method as in claim 1, wherein the plurality of results further comprise one or more determined performance metrics of the one or more determined pathways through the computer network, and wherein the graphical representation visualization further illustrates certain performance metrics corresponding to the aggregated results subset.

3. The method as in claim 2, wherein the certain performance metrics are selected from a group consisting of:

combined totals;

aggregated ratios;

average values;

overall maximums; and overall minimums.

4. The method as in claim 2, further comprising:

alerting based on thresholds applied to the certain performance metrics corresponding to the aggregated results subset.

5. The method as in claim 1, wherein the specified subset selection is based on one or more selections selected from a group consisting of:

geo locations;

services;

servers;

pods;

domains;

data centers;

network devices;

network overlays;

network underlays;

logical network entities;

applications;

address prefixes;

autonomous systems;

service providers;

subservices;

microservices;

users;

groups;

organizations; and test agents.

6. The method as in claim 1, wherein the graphical user interface provides for further specification of the specified subset selection regarding the plurality of results through expansion and collapsing of objects within the graphical representation visualization of the aggregated results subset.

7. The method as in claim 1, wherein the corresponding plurality of independent tests are performed on the corresponding plurality of services from a plurality of dispersed agents.

8. The method as in claim 1, wherein the corresponding plurality of independent tests comprise a plurality of different types of tests.

9. The method as in claim 1, further comprising:

highlighting one or more particular pathways through the computer network from the plurality of specific pathways based on a selected object within the aggregated results subset and the one or more particular pathways traversing the selected object.

10. The method as in claim 1, further comprising:

generating a shareable snapshot report based on the aggregated results subset according to the specified subset selection.

11. A tangible, non-transitory, computer-readable medium having computer-executable instructions stored thereon that, when executed by a processor on a computer, cause the computer to perform a method comprising:

obtaining a plurality of results for a corresponding plurality of independent tests performed on a corresponding plurality of services in a computer network, the plurality of results comprising one or more determined pathways through the computer network;

determining a specified subset selection regarding the plurality of results, the specified subset selection corresponding to a single target test and a single source test from the corresponding plurality of independent tests;

combining a portion of the plurality of results that correspond to the single target test and the single source test based on a node common to the single target test and the single source test into an aggregated results subset according to the specified subset selection;

generating a graphical representation visualization of the aggregated results subset, the graphical representation visualization illustrating a plurality of specific pathways through the computer network corresponding to the aggregated results subset; and providing, to a graphical user interface, the graphical representation visualization of the aggregated results subset, the graphical user interface providing for further specification of the specified subset selection regarding the plurality of results.

12. The tangible, non-transitory, computer-readable medium as in claim 11, wherein the plurality of results further comprise one or more determined performance metrics of the one or more determined pathways through the computer network, and wherein the graphical representation visualization further illustrates certain performance metrics corresponding to the aggregated results subset.

13. The tangible, non-transitory, computer-readable medium as in claim 12, wherein the certain performance metrics are selected from a group consisting of:

combined totals;

aggregated ratios;

average values;

overall maximums; and overall minimums.

14. The tangible, non-transitory, computer-readable medium as in claim 12, wherein the method further comprises:

alerting based on thresholds applied to the certain performance metrics corresponding to the aggregated results subset.

15. The tangible, non-transitory, computer-readable medium as in claim 11, wherein the specified subset selection is based on one or more selections selected from a group consisting of:

geo locations;

services;

servers;

pods;

domains;

data centers;

network devices;

network overlays;

network underlays;

logical network entities;

applications;
address prefixes;
autonomous systems;
service providers;
subservices;
microservices;
users;
groups;
organizations; and
test agents.

16. The tangible, non-transitory, computer-readable medium as in claim 11, wherein the graphical user interface provides for further specification of the specified subset selection regarding the plurality of results through expansion and collapsing of objects within the graphical representation visualization of the aggregated results subset.

17. The tangible, non-transitory, computer-readable medium as in claim 11, wherein the corresponding plurality of independent tests are performed on the corresponding plurality of services from a plurality of dispersed agents.

18. The tangible, non-transitory, computer-readable medium as in claim 11, wherein the corresponding plurality of independent tests comprise a plurality of different types of tests.

19. The tangible, non-transitory, computer-readable medium as in claim 11, wherein the method further comprises:

generating a shareable snapshot report based on the aggregated results subset according to the specified subset selection.

20. An apparatus, comprising:

one or more network interfaces to communicate with a network;

a processor coupled to the one or more network interfaces and configured to execute one or more processes; and a memory configured to store a process that is executable by the processor, the process, when executed, configured to:

obtain a plurality of results for a corresponding plurality of independent tests performed on a corresponding plurality of services in a computer network, the plurality of results comprising one or more determined pathways through the computer network;

determine a specified subset selection regarding the plurality of results, the specified subset selection corresponding to a single target test and a single source test from the corresponding plurality of independent tests;

combine a portion of the plurality of results that correspond to the single target test and the single source test based on a node common to the single target test and the single source test into an aggregated results subset according to the specified subset selection;

generate a graphical representation visualization of the aggregated results subset, the graphical representation visualization illustrating a plurality of specific pathways through the computer network corresponding to the aggregated results subset; and provide, to a graphical user interface, the graphical representation visualization of the aggregated results subset, the graphical user interface providing for further specification of the specified subset selection regarding the plurality of results.

* * * * *